US012676754B2

(12) United States Patent
    Kobel et al.

(10) Patent No.: US 12,676,754 B2
(45) Date of Patent: Jul. 7, 2026

(54) KEY CEREMONY IN MULTI-PARTY COMPUTATION

(71) Applicant: BLOCKDAEMON INC., Los Angeles, CA (US)

(72) Inventors: Vincent Kobel, Geneva (CH); Alexandre Karlov, Crans (CH); Kevin Truckenmiller, Arden Hills, MN (US); Jakob Pagter, Aarhus (DK)

(73) Assignee: Blockdaemon Inc., Los Angeles, CA (US)

( * ) Notice: Subject to any disclaimer, the term of this patent is extended or adjusted under 35 U.S.C. 154(b) by 180 days.

(21) Appl. No.: 18/232,795

(22) Filed: Aug. 10, 2023

(65) Prior Publication Data

US 2024/0372731 A1     Nov. 7, 2024

Related U.S. Application Data

(60) Provisional application No. 63/467,881, filed on May 19, 2023, provisional application No. 63/463,855, filed on May 3, 2023.

(51) Int. Cl.
    *H04L 9/32*      (2006.01)
    *H04L 9/00*      (2022.01)
    *H04L 9/08*      (2006.01)
(52) U.S. Cl.
    CPC ............ *H04L 9/3247* (2013.01); *H04L 9/008* (2013.01); *H04L 9/0894* (2013.01); *H04L 2209/46* (2013.01)
(58) Field of Classification Search
    CPC ..... H04L 9/0819; H04L 9/0825; H04L 9/085; H04L 9/0894; H04L 9/3247; H04L 9/50;
    (Continued)

(56) References Cited

U.S. PATENT DOCUMENTS

| 5,315,658 A | 5/1994 | Micali |
| 5,787,175 A | 7/1998 | Carter |

(Continued)

FOREIGN PATENT DOCUMENTS

| EP | 2503480 A1 | 9/2012 |
| WO | WO 2022/125847 A1 | 6/2022 |
| WO | 2025/098706 A1 | 5/2025 |

OTHER PUBLICATIONS

Wu, X., et al., "Poster: a certificateless proxy re-encryption scheme for cloud-based data sharing," Proceedings of the 18th ACM conference on computer and communications security, Oct. 17, 2011, pp. 869-872.

(Continued)

*Primary Examiner* — Eric W Shepperd
(74) *Attorney, Agent, or Firm* — Fenwick & West LLP

(57)          ABSTRACT

A system for performing a multi-party computation (MPC) operation may include an MPC node executed in a secure enclave. The MPC node includes executable instructions injected into the secure enclave to create an execution environment. The secure enclave performs an attestation check on the execution environment, generates a result of the attestation check, and cause the secure enclave to create a cryptographic signature on the result of the attestation check. The system may also include an attestation node in communication with the secure enclave. The attestation node verifies the cryptographic signature on the result of the attestation check and cause a decryption of an encrypted private cryptographic key shard to generate a decrypted private cryptographic key shard. The decrypted cryptographic key shard is used by the MPC node to perform part of the MPC operation.

20 Claims, 11 Drawing Sheets

(58) Field of Classification Search

CPC ..... H04L 2209/46; G06F 21/44; G06F 21/50; G06F 21/53; G06F 21/57

See application file for complete search history.

(56) References Cited

U.S. PATENT DOCUMENTS

| | | | |
|---|---|---|---|
| 5,862,346 | A | 1/1999 | Kley et al. |
| 5,940,507 | A | 8/1999 | Cane et al. |
| 6,026,163 | A | 2/2000 | Micali |
| 6,049,613 | A | 4/2000 | Jakobsson |
| 6,315,658 | B1 | 11/2001 | Weber |
| 6,587,946 | B1 | 7/2003 | Jakobsson |
| 6,687,822 | B1 | 2/2004 | Jakobsson |
| 7,111,122 | B2 | 9/2006 | Noro et al. |
| 7,139,917 | B2 | 11/2006 | Jablon |
| 7,178,021 | B1 | 2/2007 | Hanna et al. |
| 7,181,011 | B2 | 2/2007 | Trifonov |
| 7,181,017 | B1 | 2/2007 | Nagel et al. |
| 7,509,492 | B2 | 3/2009 | Boyen et al. |
| 7,711,122 | B2 | 5/2010 | Allen et al. |
| 7,792,300 | B1 | 9/2010 | Caronni |
| 8,094,810 | B2 | 1/2012 | Hohenberger et al. |
| 8,132,003 | B2 * | 3/2012 | Durham .................. H04L 9/004 718/1 |
| 8,316,237 | B1 | 11/2012 | Felsher et al. |
| 8,353,015 | B2 | 1/2013 | Carpenter et al. |
| 8,437,474 | B2 | 5/2013 | Zheng et al. |
| 8,478,996 | B2 | 7/2013 | Banerjee et al. |
| 8,515,058 | B1 | 8/2013 | Gentry |
| 8,588,425 | B1 | 11/2013 | Harwood et al. |
| 8,873,754 | B2 | 10/2014 | Xu et al. |
| 8,904,181 | B1 | 12/2014 | Felsher et al. |
| 9,037,870 | B1 | 5/2015 | Zheng et al. |
| 9,049,023 | B2 | 6/2015 | Green |
| 9,158,933 | B2 | 10/2015 | Banks et al. |
| 9,397,983 | B2 | 7/2016 | Moffat |
| 9,419,951 | B1 | 8/2016 | Felsher et al. |
| 9,635,001 | B2 | 4/2017 | Kaseda et al. |
| 10,187,347 | B2 | 1/2019 | Moffat |
| 10,587,563 | B2 | 3/2020 | Moffat |
| 10,803,194 | B2 | 10/2020 | Damgård et al. |
| 2002/0199110 | A1 | 12/2002 | Kean |
| 2003/0079120 | A1 | 4/2003 | Hearn et al. |
| 2004/0086124 | A1 | 5/2004 | Sasaki |
| 2005/0172154 | A1 | 8/2005 | Short et al. |
| 2007/0033393 | A1 * | 2/2007 | Ganesan ............... H04L 9/3226 713/155 |
| 2007/0033397 | A1 | 2/2007 | Phillips, II et al. |
| 2008/0059787 | A1 | 3/2008 | Hohenberger et al. |
| 2008/0310623 | A1 | 12/2008 | Phillips et al. |
| 2011/0058673 | A1 | 3/2011 | Zheng et al. |
| 2011/0154031 | A1 | 6/2011 | Banerjee et al. |
| 2011/0154501 | A1 * | 6/2011 | Banginwar .......... H04L 9/3236 726/26 |
| 2011/0246774 | A1 | 10/2011 | Phillips et al. |
| 2012/0328105 | A1 | 12/2012 | Mukkara et al. |
| 2012/0331283 | A1 | 12/2012 | Chandran et al. |
| 2013/0007464 | A1 | 1/2013 | Madden |
| 2013/0031366 | A1 * | 1/2013 | Simske ................. H04L 9/3247 713/168 |
| 2013/0079120 | A1 | 3/2013 | Walker et al. |
| 2013/0159701 | A1 | 6/2013 | Phillips et al. |
| 2014/0006773 | A1 | 1/2014 | Chazalet et al. |
| 2015/0067330 | A1 | 3/2015 | Khan et al. |
| 2015/0082028 | A1 | 3/2015 | Phillips et al. |
| 2015/0169892 | A1 | 6/2015 | Nord et al. |
| 2015/0215120 | A1 | 7/2015 | Bursell |
| 2016/0021109 | A1 | 1/2016 | Jueneman et al. |
| 2016/0119292 | A1 | 4/2016 | Kaseda et al. |
| 2016/0253515 | A1 | 9/2016 | Damgård et al. |
| 2017/0289197 | A1 * | 10/2017 | Mandyam ................. H04L 9/32 |
| 2017/0317997 | A1 * | 11/2017 | Smith ................... H04L 9/3247 |
| 2018/0241572 | A1 * | 8/2018 | Miele ...................... G06F 21/57 |
| 2018/0287802 | A1 * | 10/2018 | Brickell ................. H04L 9/006 |
| 2020/0014546 | A1 | 1/2020 | Karame et al. |
| 2021/0036841 | A1 | 2/2021 | Craige et al. |
| 2021/0097528 | A1 | 4/2021 | Wang |
| 2021/0224797 | A1 | 7/2021 | Berengoltz et al. |
| 2021/0374234 | A1 * | 12/2021 | Bursell .................. H04L 9/085 |
| 2021/0406386 | A1 | 12/2021 | Ortiz et al. |
| 2022/0038442 | A1 | 2/2022 | Lev et al. |
| 2022/0286291 | A1 * | 9/2022 | Guabtni .................. G06F 21/45 |
| 2022/0327530 | A1 | 10/2022 | Pagter et al. |
| 2023/0239149 | A1 | 7/2023 | Liu et al. |
| 2023/0246822 | A1 | 8/2023 | Everspaugh et al. |
| 2023/0370263 | A1 * | 11/2023 | Velagapalli ......... H04L 63/0823 |
| 2024/0144232 | A1 * | 5/2024 | White ................. G06Q 20/409 |
| 2024/0422153 | A1 * | 12/2024 | Li ......................... H04L 63/105 |
| 2025/0039001 | A1 * | 1/2025 | Smeets .................. G06F 21/44 |
| 2025/0219828 | A1 * | 7/2025 | Augustyn .............. H04L 9/085 |

OTHER PUBLICATIONS

Alansari, S., "A Blockchain-based Approach for Secure, Transparent and Accountable Personal Data Sharing," Doctoral Dissertation, University of Southampton, Aug. 2, 2020, pp. 1-218.

PCT International Search Report and Written Opinion, PCT Application No. PCT/US2024/026813, Sep. 23, 2024, 20 pages.

PCT Invitation to Pay Additional Fees, PCT Application No. PCT/US2024/026813, Jul. 30, 2024, 17 pages.

* cited by examiner

400

600

KEY CEREMONY IN MULTI-PARTY COMPUTATION

CROSS REFERENCE TO RELATED APPLICATIONS

The application claims benefit to U.S. Provisional Application No. 63/463,855, filed on May 3, 2023, and U.S. Provisional Application No. 63/467,881, filed on May 19, 2023. Both applications are incorporated by reference herein for all purposes.

FIELD

The disclosure generally relates to the architecture of a multi-party computation system and, more specifically, to a cryptographic key ceremony process for use in a multi-party computation process.

BACKGROUND

In an interconnected digital landscape, cybersecurity threats continue to evolve and become more sophisticated. To improve cybersecurity, enterprises are adopting various secure infrastructures. Oftentimes enterprises rely on features provided by cybersecurity companies and cloud computing that offers enhanced security features to set up secure infrastructures. This shift toward secure cloud-based solutions allows enterprises to offload the responsibility of maintaining complex security measures to specialized providers. Cloud providers now may provide a ready-to-use secure environment for an enterprise to run various processes. While the secure environment is proof against many known threats, the delivery of content to the secure environment may still be a point of vulnerability. For example, a malicious party may have tampered with content before the content is delivered to a secure environment.

In addition, a conventional secure environment is managed by one or more administrators of an enterprise who may have the access privilege of the secure environment. Even though the secure environment may be equipped with state-of-the-art security measures, the administrators may have sufficient privilege to obtain the entire memory content of the secure environment. This may shift the vulnerability from the secure environment to the devices possessed by the administrator. In some cases, the cloud service provider may be a vulnerability source, as the cloud service provider may be in control of the underlying infrastructure that executes the enterprise's operations.

SUMMARY

In some embodiments, the techniques described herein relate to a system for performing a multi-party computation (MPC) operation. The system may include an MPC node executed in a secure enclave, the secure enclave executed by memory, and one or more processors. The MPC node may include executable instructions injected in the secure enclave to create an execution environment, wherein the executable instructions, when executed by one or more processors of the secure enclave to: perform an attestation check on the execution environment, generate a result of the attestation check; and cause the secure enclave to create a cryptographic signature on the result of the attestation check. The system may also include an attestation node in communication with the secure enclave, the attestation node configured to: verify the cryptographic signature on the result of the attestation check; and cause a decryption of an encrypted private cryptographic key shard to generate a decrypted private cryptographic key shard, wherein the decrypted cryptographic key shard is used by the MPC node to perform part of the MPC operation.

In some embodiments, the executable instructions are part of a bootstrapping package to inject an operating system image into the secure enclave to create the execution environment.

In some embodiments, the bootstrapping package further causes one or more processors of the secure enclave to fetch one or more configuration parameters for the MPC node to create the execution environment.

In some embodiments, the memory of the secure enclave is a non-persistent storage that erases the decrypted cryptographic key shard in the memory after the MPC node is terminated.

In some embodiments, the attestation check includes: generating a quote including state information of the execution environment of the secure enclave; and verifying that one or more register counter values in the quote match one or more expected values.

In some embodiments, the secure enclave is associated with a secure enclave private key, and the cryptographic signature is generated by the secure enclave signing state information of the execution environment using the secure enclave private key.

In some embodiments, the attestation node is in communication with the secure enclave through a secure channel that is proof against man-in-the-middle attacks.

In some embodiments, the decryption of the encrypted private cryptographic key shard includes decrypting, responsive to the cryptographic signature being verified, an encryptor key file; using the encryptor key file to decrypt one or more configuration data for the MPC node; and using the encryptor key file to decrypt the encrypted private cryptographic key shard.

In some embodiments, the encrypted private cryptographic key shard is stored in persistent storage outside of the secure enclave, and the executable instructions of the secure enclave further cause the one or more processors of the secure enclave to fetch the encrypted private cryptographic key shard from the persistent storage to the secure enclave.

In some embodiments, the MPC node is the first MPC node, the secure enclave is the first secure enclave, and the decrypted cryptographic key shard is the first decrypted cryptographic key shard, wherein the system further includes a second MPC node executed in a second secure enclave and the second MPC node is associated with a second decrypted cryptographic key shard different from the first decrypted cryptographic key shard, and wherein the first MPC node and the second node jointly perform the multi-party computation operation using their respective decrypted cryptographic key shard.

In some embodiments, the cryptographic signature is time bound for a valid period, and the attestation check is performed periodically.

In some embodiments, the decrypted private cryptographic key shard is a shard of a private cryptographic key that has a public cryptographic key, and the multi-party computation operation includes a blockchain operation associated with a blockchain address corresponding to the public cryptographic key.

In some embodiments, a system may include a client device including one or more processors and memory, the memory storing executable instructions, the instructions, when executed by one or more processors, cause the one or more processors to generate a user interface that is configured to receive a user input related to a multi-party computation (MPC) operation. The system may also include a plurality of MPC nodes configured to cooperatively execute the MPC operation, wherein each MPC node is executed in an instance of a secure enclave, each MPC node is established in the respective instance of the secure enclave based on a configuration file, the configuration file of a particular MPC node is combined from a plurality of parts, and the plurality of parts of the configuration file of the particular MPC node include: (1) an encryptor key file that is uniquely associated with the particular MPC node, (2) a node-specific configuration part, and (3) a common configuration part.

In some embodiments, the encryptor key file is capable of decrypting an MPC key shard corresponding to the particular MPC node, and each MPC node is associated with a different MPC key shard.

In some embodiments, the encryptor key file is encrypted and is protected by an attestation process of the instance of the secure enclave executing the particular MPC node.

In some embodiments, each MPC node is in communication with a respective attestation node that is configured to store the encryptor key file and a data key that is used to encrypt the encryptor key file.

In some embodiments, the encryptor key file is a symmetric key that is used to encrypt and decrypt a key shard of a private cryptographic key.

In some embodiments, the encryptor key file is backed up using a Shamir split.

In some embodiments, the node-specific configuration part of each configuration file of each MPC node is different from that of another MPC node.

In some embodiments, the node-specific configuration part includes an MPC node private key that is used in secure communications among the plurality of MPC nodes.

In some embodiments, at least a parameter in the common configuration part is stored unencrypted.

In some embodiments, each MPC node of the plurality of MPC nodes is administered by a different administrator of an enterprise.

In some embodiments, the respective instance of the secure enclave is associated with a non-persistent memory, and the plurality of parts of the configuration file of the particular MPC node are injected into the secure enclave to establish an execution environment of the particular MPC node.

In some embodiments, the interface is a blockchain wallet interface, and the MPC operation is a signature creation process of a blockchain operation.

In some embodiments, a non-transitory computer-readable medium that is configured to store instructions is described. The instructions, when executed by one or more processors, cause one or more processors to perform a process that includes steps described in the above computer-implemented methods or described in any embodiments of this disclosure. In some embodiments, a system may include one or more processors and memory coupled to the processors that are configured to store instructions. The instructions, when executed by one or more processors, cause the one or more processors to perform a process that includes steps described in the above computer-implemented methods or described in any embodiments of this disclosure.

Figure 1:
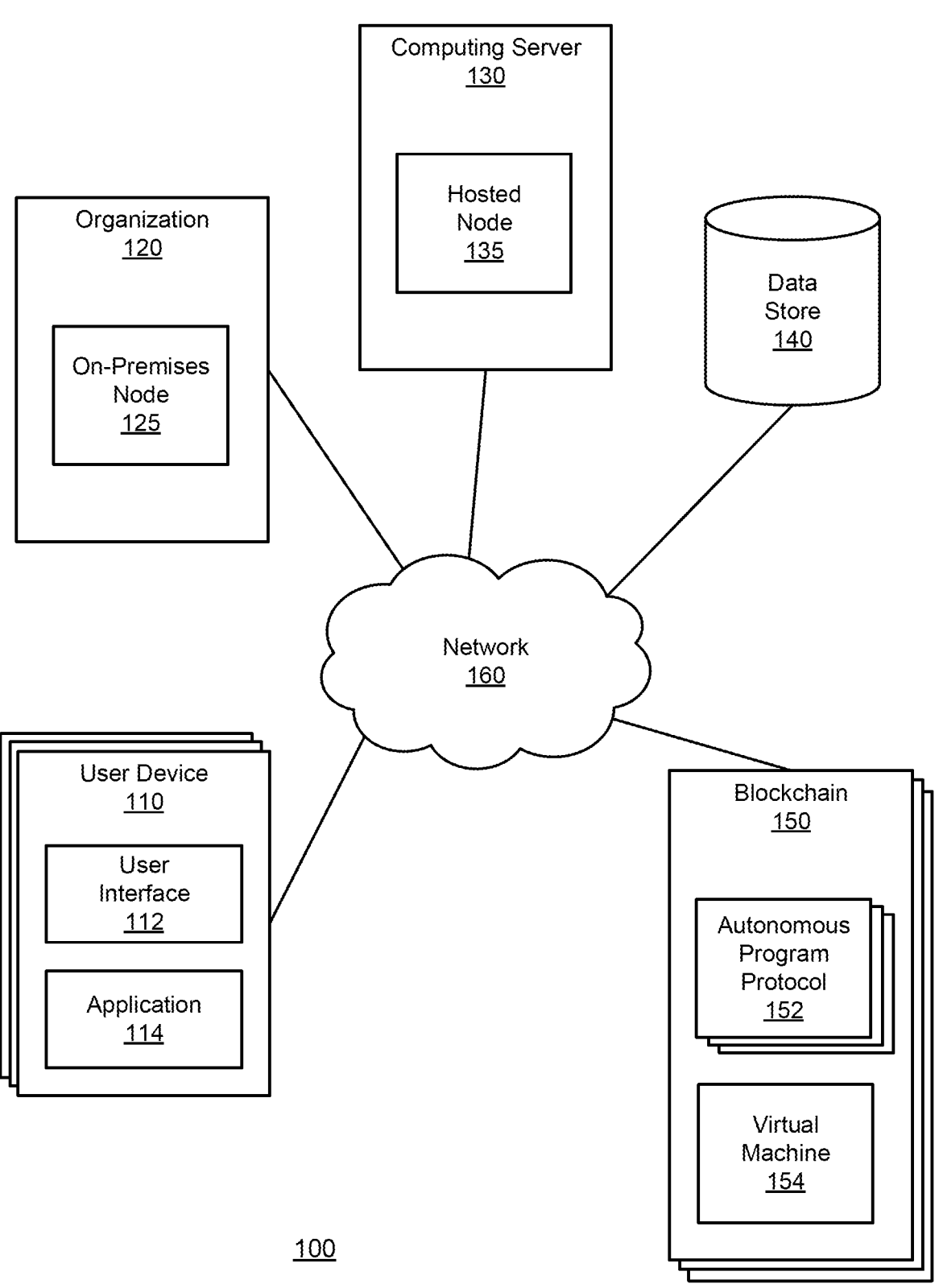
FIG. 1 is a block diagram that illustrates a system environment of a multi-party computation execution environment, in accordance with some embodiments.

The figures depict, and the detailed description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Some embodiments in this disclosure are related to a computer security architecture that provides a tamper-proof multi-party computation (MPC) system that can be deployed to an enterprise using a common cloud structure. An MPC system includes multiple MPC nodes that jointly perform confidential computation without each MPC node revealing a secret part of the MPC node. The secret parts, such as key shards, through the MPC technology, may be used to derive a secret, such as a private key. To protect the secret parts, the MPC nodes may each be executed in a secure enclave. The secure enclave provides security against access from even the cloud service provider. While a secure enclave typically includes sufficient security to protect the data and operation within the enclave, the delivery of the code to the secure enclave can be subject to tampering or other security vulnerabilities. For example, the code may be tampered with before the code is loaded into the secure enclave. In some embodiments, a key ceremony process is carried out to verify the state information of each MPC node to verify that the execution environment has not been tampered with. After verification of state information and an attestation certificate, the secret part corresponding to each MPC node may be decrypted in the secure enclave to allow the MPC node to participate in an MPC operation. The separation of the secret into multiple parts ensures that no one administrator of an MPC node will have sufficient access privileges to obtain the entire secret or the data in the entire process.

System Overview

FIG. (Figure) 1 is a block diagram that illustrates a system environment 100 of an example multi-party computation (MPC) execution environment, in accordance with some embodiments. By way of example, the system environment 100 includes a user device 110, an organization 120 that hosts on-premises nodes 125, a computing server 130 that may provide a hosted node 135, a data store 140, a blockchain 150 that has one or more autonomous program protocols 152 stored on the blockchain 150. The entities and components in the system environment 100 communicate with each other through network 160. In various embodiments, the system environment 100 may include different, fewer, or additional components. The components in the MPC execution environment 100 may each correspond to a separate and independent entity or may be controlled by the same entity. For example, in some embodiments, the computing server 130 may control the data store 140, but, in other embodiments, the computing server 130 and the data store 140 are operated by different entities. Likewise, the computing server 130 and the organization 120 can be different entities. While this disclosure uses blockchain operations as an example of an application of MPC operations, various embodiments do not necessarily have any connection with the use of blockchains. The MPC architecture described herein may have wide applications in computer security, data encryption, digital signature, privacy-preserving data analysis, fraud detection, cybersecurity, and secure computing outsourcing. The MPC architecture may also be used in industry or usage-specific applications, such as secure voting, financial transactions, contract signing, etc.

While each of the components in the system environment 100 is sometimes described in disclosure in a singular form, the system environment 100 may include one or more of each of the components. For example, there can be multiple user devices 110 communicating with the computing server 130 and various blockchain management nodes, such as the on-premises nodes 125 and hosted nodes 135. The organization 120 may typically host more than one on-premises node 125. The computing server 130 may provide service for multiple organizations 120, each of which has its own on-premises nodes 125 that are implemented as MPC nodes and multiple users who may operate different user devices 110. While a component is described in a singular form in this disclosure, it should be understood that in various embodiments, the component may have multiple instances. Hence, in the system environment 100, there can be one or more of each of the components. Likewise, while some of the components are described in a plural form may also only have a single instance in the system environment 100 in some embodiments.

A user device 110 may also be referred to as a client device. A user device 110 may be controlled by a user who may be the user of the computing server 130, the on-premises node 125, or the hosted node 135. In some situations, a user may also be referred to as an end user, for example, when the user is the organization's customer who uses a software application that is published by the organization 120. In some situations, various users may be employees of the organization 120 and perform blockchain operations under the policies of the organization 120. The user device 110 may be any computing device. Examples of user devices 110 include personal computers (PC), desktop computers, laptop computers, tablet computers, smartphones, wearable electronic devices such as smartwatches, or any other suitable electronic devices.

Blockchain operations may be any suitable operations related to blockchains 150 such as operations that are carried out on a blockchain 150 or an autonomous program protocol 152 of the blockchain 150. Examples of blockchain operations include cryptocurrency or token transactions, causing issuance of a token to a user, staking on a blockchain 150, invoking one or more algorithms of an autonomous program protocol 152, feeding data to an autonomous program protocol 152 through an oracle machine, performing mining or minting in a blockchain 150, participating in a blockchain 150 as a blockchain node, etc. In various situations, blockchain operations may be used interchangeably with blockchain transactions. A blockchain operation may involve using an organization's private key to generate a signature as proof of ownership of an organization's blockchain asset. The private key may be divided and stored as key shards that are respectively stored in different MPC nodes, as discussed in further detail below in association with FIGS. 4 and 5.

In some embodiments, there can be different types of users within an organization 120 in the setting of performing a blockchain operation or an MPC operation, depending on the roles of the users in various operations. For example, in a multi-party authorization (MPA) setting for conducting an operation, one user may be an initiator, and one or more other users may be approvers. The roles of initiator and approvers may change based on the identity of the initiator, the employee hierarchy of organization 120, and the policies set forth by organization 120. A user may also be an administrator of organization 120 who is responsible for working with the computing server 130 to manage various settings and parameters of one or more nodes of organization 120.

A user in the system environment 100 may sometimes also be referred to as a named entity. A named entity may represent a user themselves, such as an employee of an organization 120. In some embodiments, a named entity may also be a team, a department, a vendor, a contractor, or another unit of the organization 120. A user in this context may refer to the user themselves or an administrator of the named entity who takes the role of managing the named entity. An organization 120 may maintain a hierarchy of named entities, which contains information about the relationships among the named entities. In the case of an authorization policy situation, such as in an MPA, the hierarchy of the named entities may be used to determine a chain of authorization required to approve an operation. For example, a policy may specify that a transaction over a certain amount from an employee requires the employee's manager's approval.

A user device 110 may include a user interface 112 and an application 114. The user interface 112 may be the interface of the application 114 and allow the user to perform various actions associated with application 114. For example, application 114 may be a software application, and the user interface 112 may be the front end. The user interface 112 may take different forms. In one embodiment, the user interface 112 is a software application interface. For example, a business may provide a front-end software application that can be displayed on a user device 110. In one case, the front-end software application is a software application that can be downloaded and installed on a user device 110 via, for example, an application store (App store) of the user device 110. In another case, the front-end software application takes the form of a webpage interface of the organization 120 that allows clients to perform actions through web browsers. The front-end software application includes a graphical user interface (GUI) that displays various information and graphical elements. For example, the GUI may be the web interface of a software-as-a-service (SaaS) platform that is rendered by a web browser. In some embodiments, user interface 112 does not include graphical elements but communicates with a server or a node via other suitable ways, such as command windows or application program interfaces (APIs).

In system environment 100, multiple different types of applications 114 may be operated on a user device 110. Those applications 114 may be published by different entities and be in communication with different components in the system environment 100. For example, in some embodiments, a first application 114 may be a software application that is published by the organization 120 for the employees of the organization 120 to perform work-related tasks. In some embodiments, a second application 114 may be a blockchain wallet frontend application that is published by the computing server 130 (or managed by an organization 120) for a user to communicate with the on-premises node 125. In some embodiments, a third application 114 may be a software application for a user to communicate to a blockchain node, which may be a hosted node 135, for the user to gain information about a blockchain 150 or perform a blockchain operation. In some embodiments, a fourth application 114 may be a SaaS platform hosted by the computing server 130 as a web application for an administrator of an organization 120 to manage one or more nodes provided by the computing server 130. These are merely examples of various types of applications 114 that may be operated on a user device 110.

An organization 120, such as an enterprise, may be a customer of the computing server 130 and use different components, products, and services offered or managed by the computing server 130. For example, an organization 120 may install one or more on-premises nodes 125 that are provided by and in communication with the computing server 130. In some embodiments, the organization 120 may also use one or more hosted nodes 135 that may be hosted by the computing server 130. The on-premises node 125 and hosted node 135 are blockchain-related nodes that may be used to perform one or more blockchain operations. Depending on the organization's choice, a multi-node system, such as an MPC system, may use only on-premises nodes 125 that are managed by the organization, a mix of on-premises nodes 125 and hosted nodes 135, and only hosted nodes 135.

An organization 120 may set forth one or more policies specifying the authentication and authority requirements for various employees in conducting blockchain operations through the organization 120. The organization 120 may use various products and services provided by the computing server 130 to manage digital assets, maintain private keys for blockchain wallets, such as through multi-party computation provided by the functionalities of a node, operate a wallet system, perform multi-party authorization for operations, and enforce policies set forth by the organization 120. In some embodiments, an organization 120 may delegate one or more tasks (e.g., key management, operation authorization, policy enforcement) to the computing server 130 by using one or more nodes provided by the computing server 130 and/or directly communicating with the computing server 130.

An organization 120 may also be referred to as a domain. In some embodiments, the terms domain and organization may be used interchangeably. A domain refers to an environment for a group of units and individuals to operate and use domain knowledge to organize activities, enforce policies, and operate in a specific way. An example of a domain is an organization, such as a business, an institute, or a subpart thereof, and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of an organization. For example, a domain may be a subsidiary of a company. Various divisions or departments of the organization may have their own definitions, internal procedures, tasks, and entities. In other situations, multiple organizations may share the same domain.

An on-premises node 125 may be a node initially provided or designed by the computing server 130 but may be deployed and hosted on-premises in an organization 120 and controlled by the organization 120. The functionalities of an on-premises node 125 may vary depending on the embodiments. For example, in some embodiments, the on-premises node 125 may have sufficient functionalities to serve as a fully functional blockchain node of a blockchain 150. Yet, in other embodiments, one or more functionalities of an on-premises node 125 may still partially rely on the computing server 130. For example, the on-premises node 125 and the computing server 130 may cooperatively manage one or more private keys of the users of the organization 120 through MPC, and both the on-premises node 125 and computing server 130 may serve as nodes in the MPC. In some embodiments, the on-premises nodes 125 are solely managed by the organization 120, and the private keys of the organization 120 are split as key shards and separately stored in multiple on-premises nodes 125 so that the computing server 130 is not involved in the day-to-day management of the on-premises nodes except in the initial deployment and updates of features. In some embodiments, an on-premises node 125 may operate in a secure environment within the organization 120 so that the on-premises node 125 is not generally accessible by a public network such as the Internet. In such cases, the on-premises node 125 may be in communication with the computing server 130 and route certain blockchain operation requests to the computing server 130 for performing the operation. The functionalities of the blockchain node may reside in the computing server 130.

The on-premises node 125 may work with the computing server 130 to carry out a blockchain operation. For instance, in carrying out certain blockchain operations, the on-premises node 125 may first route an operation intent that includes the parameters of the operation to the computing server 130. In turn, the computing server 130, based on the current condition of the blockchain 150, may generate a draft of an operation payload that reflects the intent. The operation payload is the payload that is used to carry out the operation. The operation payload may sometimes also be referred to as a broadcast payload because it can be a payload that is used to broadcast to a blockchain 150. The computing server 130 may transmit the operation payload back to the on-premises node 125, which in turn decodes the payload and verifies that the parameters as reflected in the payload still match those in the original intent. The on-premises node 125 may ask a user device 110 to approve the payload or multiple user devices 110 to approve the payload in case of multi-party authorization. Upon proper approval, the payload may be signed and routed to the computing server 130 for broadcasting to the blockchain 150.

An on-premises node 125 may be a node that is managed and operated directly by the organization 120. For example, an on-premises node 125 may be run on devices that are controlled by the organization 120. In some embodiments, the on-premises node 125 may be operated by one or more servers of the organization 120. However, the use of a server is not a requirement. An on-premises node 125 may be operated in any device of the organization 120, such as a user device 110 of an employee of the organization 120. In another example, even though the node is described as "on-premises," the nodes may be hosted on common cloud service providers where the organization 120 is in control of the accounts managing the cloud service. As such, an on-premises node 125 does not have to reside in a device that is physically located on the premises of the offices or other physical locations of the organization 120. In some embodiments, on-premises in this context merely refers to the on-premises node 125 being managed and controlled by the organization 120. In some cases, the device operating an on-premises node 125 may be a mobile device whose physical location is not fixed. In some embodiments, an on-premises node 125 is subject to one or more security requirements set forth by an organization 120.

In some embodiments, the computing server 130 may provide a software marketplace (e.g., similar to an App store) through a digital distribution platform so that an organization 120 may add additional software components to the on-premises node 125 to expand the functionalities of the on-premises node 125. In some embodiments, each software component may be modularized so that the software component may be added and updated without affecting the system files or other software components of the on-premises node 125. One example of a software component that may be added to the on-premises node 125 is a sandbox that may operate in a secure environment and simulate the operation of a blockchain 150. The sandbox environment may be written in a language such as WEBAS-SEMBLY (WASM). The detail of the operations and sub-components of an example on-premises node 125 will be further discussed in association with FIG. 3.

In this disclosure, a node may generally refer to a worker of a larger network (e.g., a distributed computing network) of computers that may work together to perform a task. A worker may take the form of a computing device, a virtual machine, or any computing component that has processing power, memory, and storage. A node may execute a task independently, distributedly, or jointly with other nodes. An MPC node is one of the nodes performing an MPC operation. A blockchain node is a specific kind of node that participates in a blockchain network 150. A blockchain node may be a node that participates in the validation and processing of operations on the blockchain 150. Depending on the sub-type of a blockchain node, some blockchain nodes may store a copy of the entire blockchain ledger, while other nodes may only store a partial copy of the ledger. In some embodiments, the on-premises node 125 and hosted node

135 are nodes that are related to carrying out operations in blockchains and may be referred to as blockchain-related nodes. Blockchain-related nodes and blockchain nodes are different terms in this disclosure. A blockchain-related node may or may not have the full functionality to be compliant with the protocol of a blockchain 150 to serve as a blockchain node. Depending on the functionalities of a node in various embodiments, an on-premises node 125 or a hosted node 135 may include sufficient functionalities to serve as a blockchain node of a blockchain 150.

A computing server 130 may be a server that provides functionalities and services to organization customers for managing various MPC nodes and blockchain-related nodes, providing API for data of blockchains 150, deploying MPC nodes to organizations 120, providing access control features for an organization 120 to manage access to a blockchain-based on policies of the organization 120, and other blockchain-related services. The computing server 130 may also be referred to as a remote server. While the computing server 130 is referred to as a server, for simplicity, the computing server 130 may also encompass the company that operates the computing server 130. Hence, the computing server 130 described herein may refer to a business. The services provided by the computing server 130 may include access control, operation verification, sandbox environment, blockchain node, authentication, authorization, and other suitable compliance (e.g., Know Your Customers KYC) services. The detail of the operations and sub-components of the computing server 130 will be further discussed in association with FIG. 2.

While the computing server 130 is described in a singular form, the computing server 130 may include one or more computers that operate independently, cooperatively, and/or distributedly. For example, in various embodiments, the computing server 130 may take different suitable forms. In some embodiments, the computing server 130 may be a server computer that includes one or more processors and memory that stores code instructions that are executed by the one or more processors to perform various processes described herein. In some embodiments, the computing server 130 may be a pool of computing devices that may be located at the same geographical location (e.g., a server room) or be distributed geographically (e.g., cloud computing, distributed computing, or in a virtual server network). In some embodiments, the computing server 130 may be a collection of servers that independently, cooperatively, and/or distributedly provide various products and services described in this disclosure. The computing server 130 may also include one or more virtualization instances such as a container, a virtual machine, a virtual private server, a virtual kernel, or another suitable virtualization instance. The computing server 130 may provide organizations 120 with various blockchain services as form of nodes in addition to cloud-based software, such as software as a service (SaaS), through the network 160.

A hosted node 135 may be a node that is hosted by the computing server 130 for performing blockchain-related services on behalf of an organization 120. For example, a hosted node 135 may be a node that is dedicated to an organization 120. The computing server 130 may provide a management platform, such as a SaaS platform, for an organization 120 to manage the preferences and parameters of the hosted node 135 while the hosted node 135 is operated by the computing server 130. In some embodiments, the functionalities of a hosted node 135 may be similar to those of an on-premises node 125. An on-premises node 125 may provide full control and a higher level of security for an organization 120, while a hosted node 135 may be more flexible in terms of upgrades and updates and also delegate the operation of a node to the computing server 130. An organization 120, depending on its needs and situations, may select to use only on-premises nodes 125, a mix of on-premises nodes 125 and hosted nodes 135, or only hosted nodes 135. For example, in some embodiments, an MPC system may include a mix of on-premises nodes and hosted nodes 135.

The data store 140 includes one or more storage units, such as memory, that takes the form of a non-transitory and non-volatile computer storage medium to store various data. The computer-readable storage medium is a medium that does not include a transitory medium, such as a propagating signal or a carrier wave. The data store 140 may be used by the computing server 130 to store data related to the computing server 130, such as policies of various organizations 120, parameters of various nodes, and other information related to various blockchains 150. In one embodiment, the data store 140 communicates with other components by the network 160. This type of data store 140 may be referred to as a cloud storage server. Examples of cloud storage service providers may include AMAZON AWS, DROPBOX, RACKSPACE CLOUD FILES, AZURE, GOOGLE CLOUD STORAGE, etc. In another embodiment, instead of a cloud storage server, the data store 140 is a storage device that is controlled and connected to the computing server 130. For example, the data store 140 may take the form of memory (e.g., hard drives, flash memory, discs, ROMs, etc.) used by the computing server 130, such as storage devices in a storage server room that is operated by the computing server 130.

A blockchain 150 may be a public blockchain that is decentralized, a private blockchain, a semi-public blockchain, an execution layer settling data on a public blockchain (e.g., Layer 2 blockchains, rollups), or an application-specific chain. A blockchain 150 may include a ledger that records transactions, code instructions, and other information associated with various blockchain addresses. A blockchain network includes a plurality of blockchain nodes that cooperate to verify transactions and generate new blocks. In some implementations of a blockchain, the generation of a new block may also be referred to as a proposal process that is based on a consensus mechanism, which may be a mining process (e.g., proof of work) or a validation process (e.g., proof of stake). A blockchain 150 may be a new blockchain or an existing blockchain such as BITCOIN, ETHEREUM, EOS, NEAR, SOLANA, AVALANCHE, etc. The system environment 100 may include one or more blockchains 150. A blockchain 150 includes a plurality of blockchain nodes. Each blockchain node may include one or more processors. The processors in various nodes may independently or cooperatively execute various blockchain processes such as generating blocks, reaching consensus, and executing code instructions that are stored on the blockchain 150.

Some of the blockchains 150 support autonomous program protocol 152, which is a set of code instructions that are stored on a blockchain 150 and are executable when one or more conditions are met. Examples of autonomous program protocols 152 include token contracts, smart contracts, Web3 applications, autonomous applications, distributed applications, decentralized applications (dApps), decentralized finance (DeFi) applications, protocols for decentralized autonomous organizations (DAOs), protocols that generate non-fungible tokens (NFTs), decentralized exchanges, blockchain gaming, metaverse protocols, and other suitable protocols and algorithms that may be recorded on a blockchain. Smart contracts may be examples of autonomous program protocols 152 that may be executable by a computer such as a virtual machine 154 of the blockchain 150. Here, a computer may be a single operation unit in a conventional sense (e.g., a single personal computer), a resource of the blockchain such as a virtual machine 154, or a set of distributed computing devices that cooperate in executing the code instructions (e.g., a distributed computing system). An autonomous program protocol 152 includes a set of instructions. The instructions, when executed by one or more processors, cause one or more processors to perform steps specified in the instructions. The processors may correspond to a blockchain node of the blockchain 150 or may be distributed among various nodes of the blockchain 150.

A virtual machine 154 is a resource unit of a blockchain 150. A virtual machine 154 may be a standardized software execution environment that emulates the functionality of a physical machine and allows for the execution of autonomous program protocol 152 on the virtual machine 154. A virtual machine 154 may be run by any blockchain node. In some embodiments, a virtual machine 154 may take the form of a sandboxed environment that is created within the blockchain network to execute autonomous program protocol 152. The autonomous program protocols 152 are compiled into bytecode that can be executed by the virtual machine. One example of the virtual machine 154 Ethereum Virtual Machine (EVM) that executes the programming language SOLIDITY. In some embodiments, a virtual machine 154 may operate based on binary instruction language such as WEBASSEMBLY that can be executed in a variety of environments, such as web browsers. An example of such a virtual machine 154 is Ethereum WebAssembly (EWASM) which may allow programmers to build autonomous program protocols 152 using various common programming languages.

The communications among a user device 110, an organization 120, the computing server 130, a hosted node 135, and the blockchain 150 may be transmitted via a network 160. The network 160 may be a public network such as the Internet. In one embodiment, the network 160 uses standard communications technologies and/or protocols. Thus, the network 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats, including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 160 also includes links and packet-switching networks such as the Internet.

Example Computing Server

Figure 2:
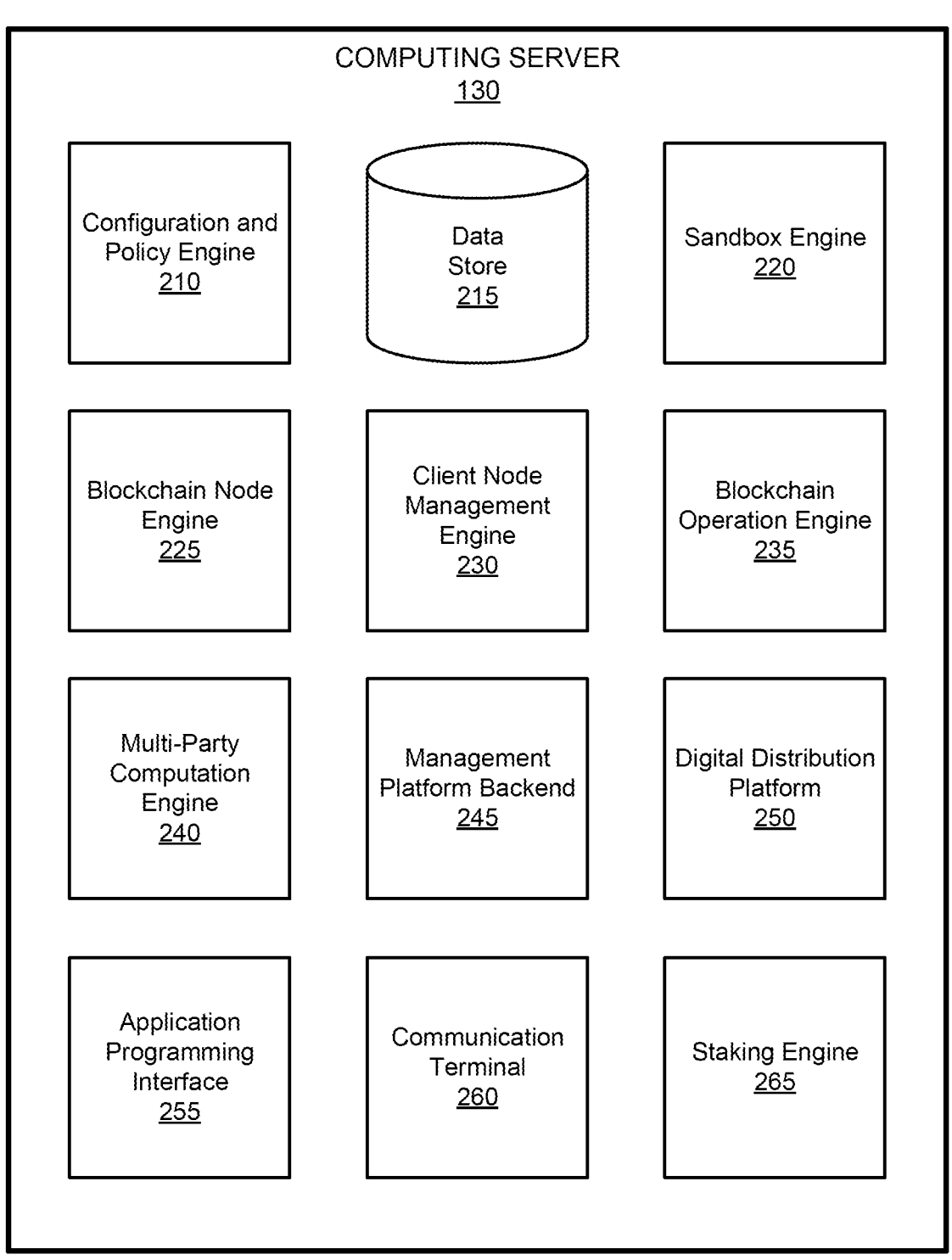
FIG. 2 is a block diagram representing an example computing server, in accordance with some embodiments.

FIG. 2 is a block diagram representing an example computing server 130, in accordance with some embodiments. In the embodiment shown in FIG. 2, the computing server 130 includes configuration and policy engine 210, data store 215, sandbox engine 220, blockchain node engine

225, client node management engine 230, blockchain operation engine 235, multi-party computation engine 240, management platform backend 245, digital distribution platform 250, application programming interface (API) 255, communication terminals 260, and a staking engine 265. The functions of the computing server 130 may be distributed among different components in a different manner than described below. Also, in various embodiments, the computing server 130 may include different, fewer, and/or additional components.

While the computing server 130 is used in a singular form, the computing server 130 may include one or more computers that include one or more processors and memory. The memory may store computer code that includes instructions. The instructions, when executed by one or more processors, cause the processors to perform one or more processes described herein. The computing server 130 may take different forms. In some embodiments, the computing server 130 is a single computer that executes code instructions directly. In some embodiments, the computing server 130 is a group of computing devices that communicate with each other. The computing devices may be located geographically at the same (e.g., in a server room) or in different locations. In some embodiments, the computing server 130 includes multiple nodes that operate in a distributed fashion such as in cloud computing or distributed computing. Each node may include one or more computing devices operating together. In some cases, the computing server 130 may also include virtual machines. In some embodiments, each component in FIG. 2 may be operated by a separate server and the computing server 130 may serve as the collective term of those servers. Any computing devices, nodes, or virtual machines, singular or plural, may simply be referred to as a computer, a computing device, or a computing server. Components of the computing server 130 shown in FIG. 2, individually or in combination, may be a combination of hardware and software and may include all or a subset of the example computing system illustrated and described in FIG. 9.

In some embodiments, the configuration and policy engine 210 may store and determine policy rules for various participants in an organization 120 for the use of organizational resources to conduct operations, such as blockchain operations. A policy may be defined by an organization 120 or automatically added or defined by the computing server 130 based on certain default settings. An organization 120 may transmit the policy set to, or build the policy at, a policy management platform (e.g., a SaaS platform) operated by the computing server 130. The configuration and policy engine 210 translates the policy to suitable parameters, conditions, and triggers that are maintained by the computing server 130. The policies may be of different suitable natures, such as requirements related to authentication, identity verification, authorization, access control, and compliance. Based on the policies specified by an organization 120, the computing server 130 may adjust one or more nodes (e.g., an on-premises node 125 and a hosted node 135) for the organization 120 to provide authorization requirements, security, protection and access control to a blockchain 150, such as an autonomous program protocol 152 recorded on the blockchain 150. An organization 120 may specify one or more access control settings that define various criteria for completing operations with an autonomous program protocol 152. For example, the access control settings may define who can gain access to an autonomous program protocol 152 and the manner in which a party may access the autonomous program protocol 152. The settings may define authorization and an access control list that may be specific to a blockchain 150, an autonomous program protocol 152, a transaction amount, and/or an operation type. For example, a policy of an organization 120 may specify an approval process for performing certain operations as may be defined by the organization 120 as sensitive, such as adding a user, staking in a blockchain 150, transferring cryptocurrency, etc. The policy may define a threshold requirement for an initiator to initiate the operation and an approval flow for the operation, such as a multi-party authorization workflow that requires one or more approvers to authorize the operation.

A policy may be generic or specific. A specific policy may be a policy that is customized by an organization 120 and is specific to a certain named entity, a type of operation, a transaction threshold, and/or another criterion. A specific policy defines a specific rule with respect to an operation that meets certain criteria. For example, an organization 120 may define a multi-party authorization workflow that requires a manager to approve an employee's initiation of an operation that is categorized by the organization 120 as sensitive. In contrast, a generic policy may be a policy that is commonly applied to many operations, such as a threshold amount for transactions that exceed the threshold. The configuration and policy engine 210 may include or suggest default rules for a generic policy and may enforce a generic policy for various autonomous program protocols 152 based on the selections of an organization 120. A policy may also preapprove an operation based on certain conditions, require authorization before an operation is approved, and/or impose certain reporting requirements after the operation is carried out. A policy may also be ruled-based or dynamic. For example, a policy may be carried out by a machine learning model that does not have a very specific and fixed rule for defining a policy.

In some embodiments, policies may be cryptographically enforced. In some embodiments, blockchain operations are signed as policy compliant after the applicable policies have been enforced. Operation approvals can be conducted using programmatic APIs, manual approvers, or a combination of both. In some embodiments, an organization 120 may specify policies and associated conditions through a user-friendly platform provided by the computing server 130. The configuration and policy engine 210 translates the policies to the appropriate parameters and conditions and transmits the policies to an on-premises node 125 for the policy to be cryptographically enforced. In some embodiments, the policies may be stored on-premises of the organization 120 as discussed in further detail below in association with the configuration and policy engine 310 operated by the on-premises node 125.

In some embodiments, the data store 215 is a database that stores various information with respect to settings provided by customers of the computing server 130, such as organizations 120. The data stored may include profiles of organization customers, named entity hierarchies of organizations 120, node settings of the customers, and various policies associated with blockchain operations specified by the customers. The data store 215 may also include or be in communication with a credential vault that stores user identifiers and passwords and the computing server 130 may perform authentication of a customer. The data store 215 may also store data and metadata related to various operations involving an autonomous program protocol 152. For example, the computing server 130 may have the functionalities of serving as blockchain nodes of various blockchains 150. Various information related to a blockchain 150, such as the full ledgers of the blockchain 150, may also be stored in data store 215 to allow an inquirer to query for information on the blockchain 150, such as through the API 255.

In some embodiments, a sandbox engine 220 may provide a sandbox environment that allows a party that attempts to invoke one or more function calls of an autonomous program protocol 152 to simulate the operation at the computing server 130 first before actually invoking the autonomous program protocol 152 recorded on a blockchain 150. The sandbox environment may be a secure and isolated execution environment such as an isolated virtual machine that can be run without direct access to the underlying system resources so that any code run in the sandbox environment cannot access or modify any resources outside of the sandbox's allocated space or impact the main blockchain network. For example, a party may have an operation request that is to be sent to an autonomous program protocol 152 for execution. The party may use the sandbox engine 220 to simulate the result of the autonomous program protocol 152 carrying out the request and determine whether the result generates the desired outcome and/or whether the result generates any undesirable side effects. In some embodiments, the sandbox engine 220 allows an organization 120 to evaluate the operations and administrations of a blockchain wallet to be maintained by the on-premises node 125. One or more policies specified by the organization 120 may also be tested in the sandbox engine 220.

In some embodiments, the blockchain node engine 225 provides the functionalities for one or more computing devices of the computing server 130 to serve as blockchain nodes of various blockchains 150. A blockchain node may be a node that participates in the validation and processing of operations on the blockchain 150. Depending on the sub-type of a blockchain node, some blockchain nodes may store a copy of the entire blockchain ledger, while other nodes may only store a partial copy of the ledger. The cryptographic key management engine 225 may maintain up-to-date functionalities to meet the current protocol requirements of various blockchains 150 so that the devices of the computing server 130 may continue to serve as blockchain nodes for blockchains 150. A customer of the computing server 130 may use a blockchain node maintained by the blockchain node engine 225 in various contexts. For example, a blockchain node may include the information of the ledger of a blockchain 150 and the customer may query the blockchain node engine 225 to retrieve information related to the blockchain 150 through an API call. In some embodiments, an on-premises node 125 may not have the full functionalities of a blockchain node or may not be fully updated to be compliant with the protocol requirements of a blockchain 150. An organization 120 may conduct blockchain operations by using an on-premises node 125 to reach the blockchain node engine 225. The blockchain node engine 225 may also provide the computing server 130 with access and information to various blockchains 150.

In some embodiments, a client node management engine 230 may manage the hosted nodes 135 of the customers of the computing server 130 and may set the initial settings of the on-premises nodes 125 before an on-premises node 125 is deployed to an organization 120. The computing server 130 may provide a node management platform for an organization 120 to adjust the settings of a node. Based on the settings, the client node management engine 230 may adjust the parameters and functionalities of the nodes associated with the organization 120. In some embodiments, a hosted node 135 and an on-premises node 125 may have different functionalities and updates of those two different types of nodes may be different. For example, a hosted node 135 may be run at the computing server 130 and may be updated instantly and dynamically based on the settings of the organization 120. An on-premises node 125 may be run at a device of the organization 120 and the organization 120 may adjust the on-premises node 125 directly or receive update installation packages that will change the on-premises node 125.

In some embodiments, the blockchain operation engine 235 may carry out and participate in carrying out various blockchain operations that are requested by customers, such as blockchain transactions, staking requests, and usages of autonomous program protocols 152. The blockchain operation engine 235 may generate the payload of the operation that is to be broadcasted to a blockchain 150. The payload may be referred to as an operation payload or a broadcast payload. Depending on embodiments with respect to where the private key is saved, if the computing server 130 is in the custody of the private key on behalf of a customer, the blockchain operation engine 235 may sign the payload and broadcast the operation through one of the blockchain nodes. In some embodiments, an organization customer has custody of the private key. In such a case, the blockchain operation engine 235 may transmit the unsigned payload to an on-premises node 125 for the on-premises node 125 to verify and sign the payload. For example, the blockchain operation engine 235 may be used to generate a payload that is sent to an on-premises node 125 for verification of the operation intents before one or more relevant parties sign the payload using private keys. The blockchain operation engine 235 may retrieve dynamic data elements that may be required to broadcast an operation to a blockchain 150. The dynamic data elements may be retrieved from a blockchain node. Based on the dynamic data elements that are dependent on the current conditions of the blockchain 150 and the non-dynamic data elements that are provided as part of the operation intent transmitted by the on-premises node 125, the blockchain operation engine 235 may generate an unsigned payload and transmit the payload to the on-premises node 125 for verification. Depending on the protocol of a blockchain 150, the payload may be in the format of bytecode.

In some embodiments, a multi-party computation (MPC) engine 240 provides or participates in MPC operations. The multi-party computation engine 240 may serve as a node in an MPC network where a group of nodes jointly perform computation without revealing the inputs of the nodes to each other. MPC may be used to securely generate a private key. By using MPC, the private key can be generated without any node possessing the entire key, thereby improving security and preventing any single point of failure. In some embodiments, any one of the multi-party computation engine 240, on-premises node 125, or hosted node 135 may participate in an MPC operation. In some embodiments, the computation of a private key may completely occur within an organization 120 so that the multi-party computation engine 240 operated by the computing server 130 is not involved. In some embodiments, the multi-party computation engine 240 operated by the computing server 130 may store part of the shard of a private key and the MPC is conducted using a few on-premises nodes 125 and the multi-party computation engine 240. U.S. Pat. No. 10,803,194, patented on Oct. 13, 2023, entitled "System and a Method for Management of Confidential Data," is incorporated by reference herein for all purposes.

In some embodiments, a management platform backend 245 may maintain the backend component of one or more management platforms (e.g., SaaS platforms) that allow organizations 120 to create policies, manage client nodes, and perform other actions related to the services provided by the computing server 130. For example, the computing server 130 may provide a SaaS platform with a user-friendly front-end graphical user interface (GUI) that is rendered in a web browser. The front-end GUI is in communication with the management platform backend 245 that stores various inputs and settings provided by an organization 120. The SaaS platform may also allow organizations 120 to manage client nodes and perform other actions associated with the computing server 130. In some embodiments, the management platform backend 245 may additionally be associated with one or more APIs. An organization 120 may directly adjust policies and node settings through one or more API calls instead of going through a GUI.

In some embodiments, a digital distribution platform 250 may take the form of a software marketplace that allows an organization 120 to add one or more software applications to a client node (e.g., an on-premises node 125 or a hosted node 135) to expand the functionalities of the client node. For example, a user of the organization 120 may browse and select various applications of the digital distribution platform 250. For the applications that are selected by the organization 120, the code of the selected applications is incorporated into a client node to expand the functionalities and features of the client node. For example, an on-premises node 125 may initially include certain basic functionalities, such as one or more components that will be described in further detail in FIG. 3. An organization 120 may expand the functionalities of the on-premises node 125 by adding one or more software applications. In one case, an initial on-premises node 125 may not initially come with a sandbox environment such as a WASM module. The organization 120 may add such functionality through the selecting software application listed in the digital distribution platform 250. Each software application may be modularized so that the update of an individual software application typically does not affect the rest of the on-premises node 125. The use of modularized software applications may allow an organization 120 to fully control the operation of the on-premises node 125 and expand and update the functionalities by adding or updating a software application downloaded from the digital distribution platform 250. In some embodiments, the digital distribution platform 250 may be open or semi-open to various third-party developers to list their software applications that can be incorporated into a client node. For example, the computing server 130 may operate a blockchain node management ecosystem that allows other participants to design and list their software applications in the digital distribution platform 250.

In some embodiments, an application programming interface 255 allows a party to communicate with and access the functionalities of the computing server 130 directly through a programming language. For example, the computing server 130 may operate blockchain nodes and store ledgers of blockchains 150. A user may query the information of a blockchain 150 through an API call. In some embodiments, a user may also conduct a blockchain operation through a blockchain node operated by the computing server 130. The user may use an API call to initiate the operation request. In some embodiments, a user may also subscribe to the API 255. For example, the notifications can be provided in the form of pull notifications by conventional API in which the recipient may continuously poll the API. In some embodiments, the notifications can be provided through webhook, which may be a form of push API notifications where the computing server 130 automatically transmit the API notifications to the recipient when a matching event has occurred. An API notification, such as a webhook notification, may include a header and a payload. The payload may be in the format of key-value pairs that are in the format of JavaScript Object Notation (JSON), Extensible Markup Language (XML), Yet Another Markup Language (YAML), and Comma-Separated Values (CSV) or another suitable format.

In some embodiments, a communication terminal 260 of the computing server 130 may provide network and blockchain connections between the computing server 130 and various entities that communicate with the computing server 130. The computing server 130 may serve as a node of various blockchains to provide up-to-date information about the state of the blockchain. The computing server 130 may include different terminals such as blockchain terminal, asset exchange terminal, and messaging application terminal. Each terminal may manage a data feed or a webpage that publishes information regarding the related services and server status. Each terminal may also include its individual API. A communication terminal 260 may also include an oracle machine that may serve as a data feed for an autonomous program protocol 152. The oracle machine may receive different data from various sources. For example, different parties may provide information and data to the oracle machine. When relevant information is obtained by the oracle machine, some code instructions of the autonomous program protocol 152 may be triggered if certain conditions are met.

In some embodiments, a staking engine 265 may allow a party to stake cryptocurrency in a blockchain 150 to participate in the consensus mechanism of a blockchain 150 that uses proof of stake. In staking, participants hold a certain amount of cryptocurrency as a stake in a blockchain 150. The participants use the amount as collateral to participate in block validation. By staking the cryptocurrency, participants usually receive rewards when new blocks are validated in the blockchain 150. In some embodiments, customers of the computing server 130 may delegate the cryptocurrency holdings to a pool of blockchain nodes that are responsible for validating transactions and creating new blocks on the blockchain 150. The staking engine 265 may provide a dashboard that includes information about staking performance and rewards. In some embodiments, staking of cryptocurrency of an organization 120 may require an authorization process such as a multi-party authorization that is discussed in this disclosure.

Example Client Node

Figure 3:
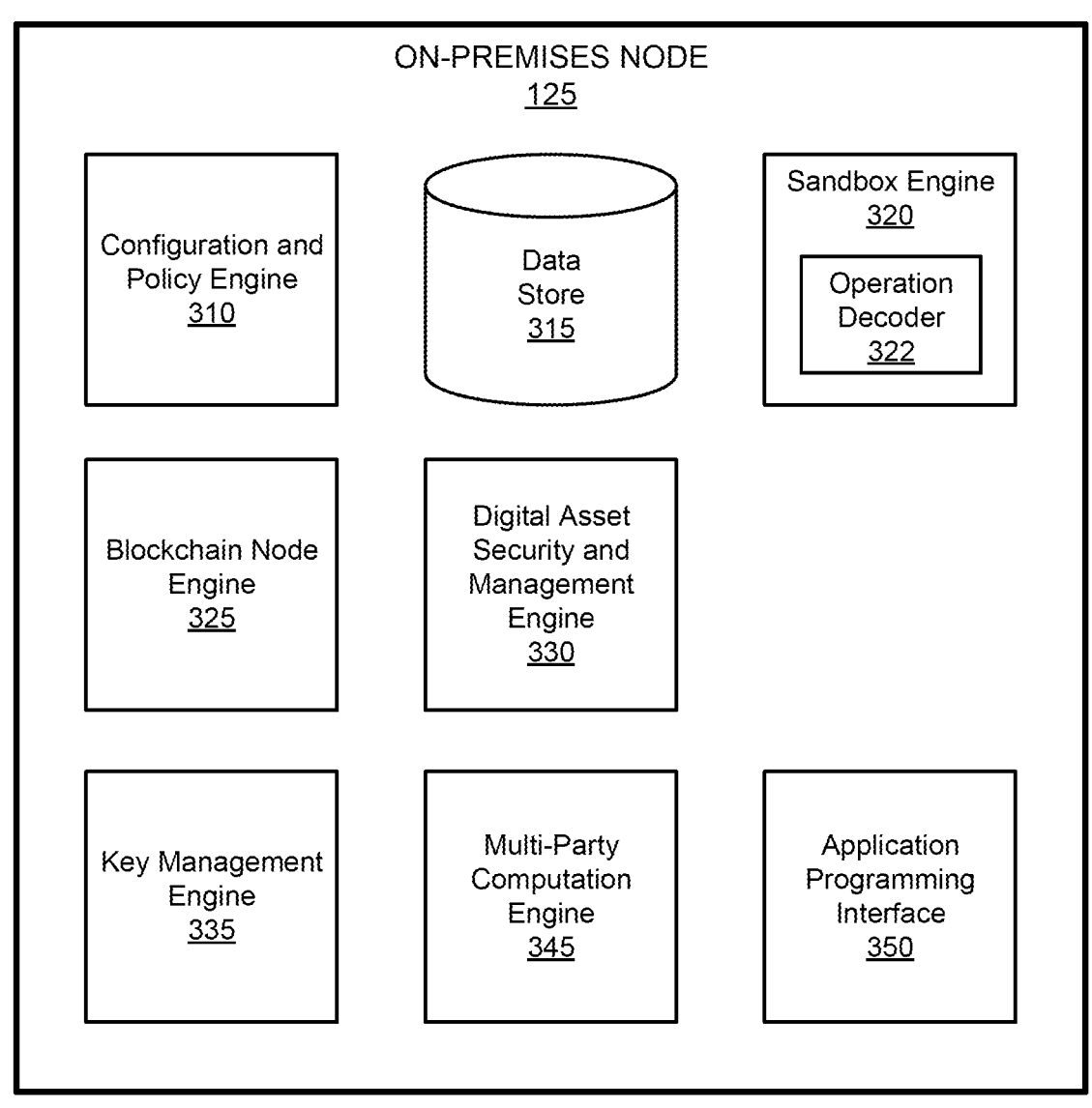
FIG. 3 is a block diagram representing an example on-premises node, in accordance with some embodiments.

FIG. 3 is a block diagram representing an example on-premises node 125, in accordance with some embodiments. In the embodiment shown in FIG. 3, the on-premises node 125 may include a configuration and policy engine 310, data store 315, sandbox engine 320, blockchain node engine 325, digital asset security and management engine 330, key management engine 335, staking engine 340, multi-party computation engine 345, and API 350. The functions of the on-premises node 125 may be distributed among different components in a different manner than described below. Also, in various embodiments, the on-premises node 125 may include different, fewer, and/or additional components. For example, an on-premises node 125 may initially include fewer components and an organization 120 may expand the functionalities of the on-premises node 125 by adding software components to the on-premises node 125 from the digital distribution platform 250.

In some embodiments, a hosted node 135 may also have the functionalities and components described in FIG. 3. The functionalities and components of an on-premises node 125 and those of a hosted node 135 may be the same or different. The discussion of the on-premises node 125 may equally apply to a hosted node 135 and is not repeated in this disclosure for the hosted node 135, except for the differences already noted in the rest of the disclosure.

In some embodiments, a configuration and policy engine 310 may be a node-side policy management engine whose functionalities and usages are the same or very similar to those of the configuration and policy engine 210. An on-premises node 125 may provide a policy management platform for an organization 120 to establish policies associated with any blockchain operations. In some embodiments, a policy specified by an organization 120 may be stored on-premises and may be cryptographically enforced. For example, the configuration and policy engine 310 may possess a private cryptographic key, either through storing the private key secretly in a conventional sense or through the ability to re-generate the private key through MPC. An operation that is in compliance with one or more policies is signed by the configuration and policy engine 310 using the private key to indicate policy compliance.

In some embodiments, a data store 315 may be a node-side data store whose functionalities and usages are the same or very similar to those of the data store 215. The data stored may include any suitable information related to the organization 120, node settings of the on-premises node 125, policies associated with the blockchain operations of the organization 120, and part of the shards of private cryptographic keys that may be used in MPC to generate one or more private keys.

In some embodiments, a sandbox engine 320 may be a node-side sandbox engine whose functionalities and usages are the same or very similar to those of the sandbox engine 220. The sandbox engine 320 allows a user to perform testing and simulation using the on-premises node 125. In some embodiments, the sandbox engine 320 may be designed using code language that uses binary instructions such as WASM so that a secure and isolated execution environment may be established on the on-premises node 125 without affecting the security of the rest of the on-premises node 125. The sandbox engine 320 may be built using a blockchain-specific code (typically a higher-level language) and be cross-compiled into a binary instruction format such as WASM so that the sandbox engine 320 has the capability to operate using the blockchain-specific code while is not limited to only the blockchain specific code.

In some embodiments, the sandbox engine 320 may include an operation decoder 322. The operation decoder 322 has the capability of decoding blockchain codes to other types of codes, such as more human-readable parameters. In some embodiments, the operation decoder 322 may receive an operation payload of an operation. The operation payload is typically in bytecode. The operation decoder 322 may decode the payload to generate parameters of the operation by converting the bytecode back into human-readable parameters. The parameters, as reflected in the operation payload may be compared to the parameters in the original operation intent to see if the two sets of parameters match each other. The operation decoder 322 may be run on a binary language environment provided by the sandbox engine 320. The bytecode of the operation payload may be compiled from a source code that uses a higher-level language such as SOLIDITY, VYPER, or any programming language that is used by a specific blockchain 150. The sandbox engine 320 may simulate the programming language and decode the bytecode back to source code parameters.

In some embodiments, a blockchain node engine 325 may be a node-side blockchain node whose functionalities and usages are the same or very similar to those of the blockchain node engine 225. In some embodiments, an organization 120 may decide not to use an on-premises node 125 as a blockchain node, such as by isolating the on-premises node 125 from the general Internet due to security reasons. In such embodiments, the blockchain node engine 325 may not directly communicate with other nodes on a blockchain 150. Instead, any blockchain operations may be transmitted to the computing server 130 before the operations are broadcasted to a blockchain 150. In other embodiments, the blockchain node engine 325 may have the functionality of a blockchain node and serves as one of the blockchain nodes of a blockchain 150. An organization 120 may have full control over the extent of functionalities of the on-premises node 125.

In some embodiments, a digital asset security and management engine 330 may allow an organization 120 to establish an on-premises blockchain wallet system for the organization 120. The wallet system may reside within organization 120 to allow organization 120 to have full control of the wallet system. The digital asset security and management engine 330 may allow the organization to customize the wallet system and enforce one or more policies on the operations of the wallet system. The digital asset security and management engine 330 may operate with the key management engine 335 and the multi-party computation engine 345 to provide an MPC vault for storing private cryptographic keys in an MPC secure fashion. The API 350 of one or more on-premises nodes 125 allows individual users of the organization 120 to access the wallet system so that the digital asset security and management engine 330 may provide an institutional-grade Wallet as a Service (WaaS) to the users. An organization 120 may also choose to operate an on-premises node 125 as an "offline" node that is not accessible by the general Internet. In such a case, the wallet system established by the digital asset security and management engine 330 may provide a cold wallet to the organization 120.

In some embodiments, the digital asset security and management engine 330 may establish a wallet system by enforcing one or more policies of the organization 120 managed by the 310, verify a proposed blockchain operation involving the wallet system by verifying the intents, and using the key management engine 335 to sign the operation that is authorized. For example, an initiator user may initiate an operation request that includes a list of intent parameters, such as the blockchain network, the transaction amount, the source address, the destination address, etc. The digital asset security and management engine 330 may check whether the operation request is in compliance with one or more policies that are applicable to the operation request by comparing the intent parameters to the conditions and parameters of the policies. Upon verifying that the operation request is in compliance, the digital asset security and management engine 330 may transmit the operation request that includes the list of intent parameters to the computing server 130 to generate an un-signed operation payload of the operation. Since the on-premises node 125 may be treated by the organization 120 as a tightly managed secure environment, the computing server 130 may be treated as an untrusted source because the communications with the computing server 130 are through the Internet and may be tampered with. The un-signed operation payload may be transmitted to the digital asset security and management engine 330. In turn, the digital asset security and management engine 330 uses the operation decoder 322 of the sandbox engine 320 to decode the payload to extract the intent parameters as reflected in the payload. The digital asset security and management engine 330 may compare those extracted intent parameters to the original intent parameters in the operation request. If the intent parameters match, the digital asset security and management engine 330 may determine whether there is a policy governing the authorization of the operation. For example, in some embodiments, an operation may require multiple parties' authorization, such as from the initiator and one or more additional approvers. The digital asset security and management engine 330 uses the key management engine 335 to seek authorization and signatures from the approvers. In some cases, the configuration and policy engine 310 may also provide a signature to indicate that the operation is in compliance with the policies of the organization 120. After one or more signatures are obtained, the digital asset security and management engine 330 may send the signed operation payload to the computing server 130, which may serve as a blockchain node to broadcast the operation to a blockchain 150.

In some embodiments, a key management engine 335 may store and manage one or more cryptographic private keys for various users of an organization 120 to allow users of the organization 120 to participate in various blockchains and to generate digital signatures for various blockchain operations such as requests to access autonomous program protocols 152. The cryptographic key management engine 335 stores various private cryptographic keys of the organization 120. In some embodiments, the key management engine 335 may store a private key by storing the entire string of the private key secretly in a conventional sense. In some embodiments, a key management engine 335 may store a shard of a fragment of a private key for MPC to generate a private key. For example, the organization 120 may operate multiple on-premises nodes 125 and the key management engine 335 of each node may store a shard of a respective fragment of the private key. In some embodiments, upon retrieving a private key, the key management engine 335 may generate a digital signature on behalf of a key owner. In some embodiments, the key management engine 335 may also have the capability of generating a new pair of private and public cryptographic keys. For example, the organization 120 may have a new user and the key management engine 335 may generate a new key pair. The private key is kept secret while the public key may be published to a blockchain 150 or a certificate authority.

In some embodiments, an MPC engine 345 may provide the functionalities for MPC operations. Details of how one or more nodes may become part of an MPC system is further discussed in FIGS. 4 and 5. In some embodiments, a private key of an organization 120 may be entirely controlled by the organization 120. For example, the organization 120 may operate multiple on-premises nodes 125. In some embodiments, the MPC operation may include one or more on-premises nodes 125 and a node from outside of the organization 120, such as the computing server 130 or a hosted node 135. The flexibility allows the organization 120 to decide how to most securely store its private keys based on the situations of the organization 120.

In some embodiments, an API 350 may have functionalities and usages that are the same or very similar to those of the API 255. The API 350 may be used to serve users of the organization 120. For example, the API 350 may be used for user devices 110 to communicate with the wallet system maintained by the digital asset security and management engine 330.

Example MPC Node System

Figure 4:
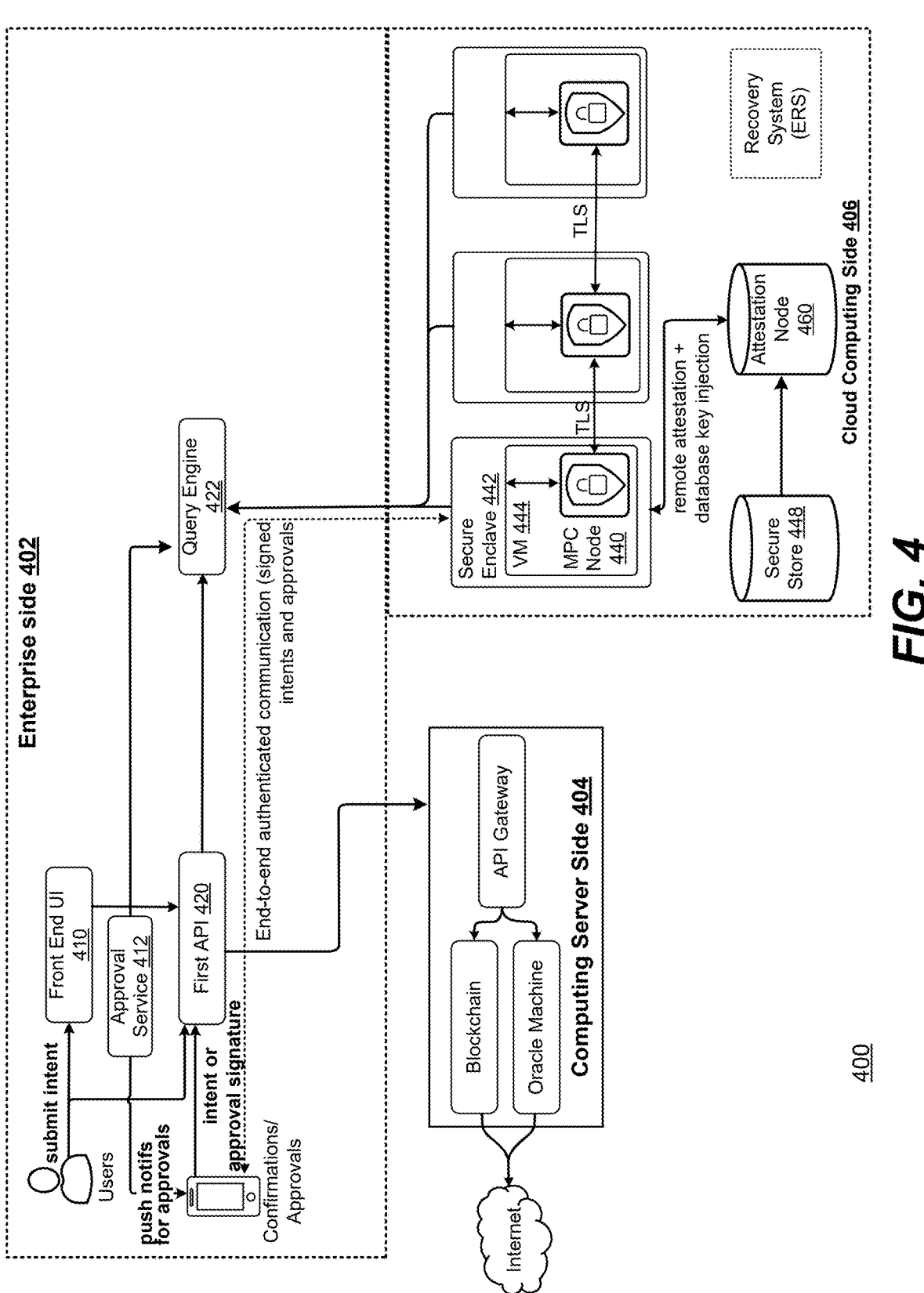
FIG. 4 is a conceptual block diagram illustrating a multi-party computation architecture, in accordance with some embodiments.

FIG. 4 is a conceptual block diagram illustrating a multi-party computation (MPC) architecture 400, in accordance with some embodiments. The architecture may be used to implement one or more on-premises nodes 125 with the security and features of multi-party computation. Various engines discussed in FIG. 3 of an on-premises node 125 may be distributed or jointly executed by various components in this on-premises multi-party computation architecture 400. In some embodiments, an MPC system may also include one or more on-premises nodes 125 and one or more hosted nodes 135.

In some embodiments, the on-premises multi-party computation architecture 400 may be further divided into an enterprise side 402, a computing server side 404, and a Cloud computing side 406, although one or more components illustrated in FIG. 4 as being located on one side may be changed to another side in other embodiments. The functionalities and features discussed on each side may also be moved to another side in other embodiments.

The enterprise side 402 may include components that are operated by an enterprise, such as an organization 120, which is a customer of the computing server 130. For example, the enterprise uses the on-premises MPC offered by the computing server 130 and sets up the on-premises MPC architecture 400 based on various configurations and files provided by the computing server 130. The enterprise side 402 may include front-end user interfaces 410, such as mobile applications for the enterprise employees, to access enterprise services that are powered by the on-premises multi-party computation architecture 400. In the use case of blockchain operations, an example of the front-end user interface 410 may be a blockchain wallet user interface that allows an employee to manage blockchain units. Other examples of front-end user interfaces 410 may include various mobile applications published by the enterprise for various internal or external organization purposes. The enterprise side 402 may include one or more user devices 110, which may also be referred to as client devices. A client device may include one or more processors and memory. The memory storing executable instructions that, when executed by one or more processors, cause one or more processors to generate a user interface that is configured to receive a user input related to an MPC operation. For example, the MPC operation may be a signing of a blockchain operation using a private key whose shards are distributed among multiple MPC nodes.

The enterprise side 402 may also include an approval service 412 that approve, deny, and adjust operations based on organizational policies, such as a multi-party authorization workflow. The approval service 412 may be part of the configuration and policy engine 310 and may be configured to carry out approval based on policies managed by the configuration and policy engine 310.

The enterprise side 402 may include one or more instances of an application programming interface, such as various instances of API 350, to communicate with other sides in the on-premises multi-party computation architecture 400. By way of example, the enterprise side 402 may include a first API 420 that is used to communicate with the computing server side 404 to access the features and services provided by the computing server 130, as discussed in FIG. 2. The enterprise side 402 may include a second API that takes the form of a query engine 422 for communication with the cloud computing side 406, which primarily performs MPC operations. The query engine 422 may use one or more network protocols to facilitate secure communication with the cloud computing side 406. By way of example, the query engine 422 may use message queuing telemetry transport (MQTT) protocol.

The computing server side 404 may include one or more features and functionalities offered by the computing server 130 as discussed in various engines and components of the computing server 130 in FIG. 2. For example, the computing server side 404 may include a blockchain node that is used to broadcast a blockchain operation initiated on the enterprise side 402 (e.g., initiated by a user using the front-end user interfaces 410) and verified and signed by MPC nodes that are executed in the cloud computing side 406. In some embodiments, to further protect the security of the enterprise, an MPC operation and a blockchain operation may be communicated to the Internet only through the computing server side 404. For example, in some embodiments, for certain sensitive operations, the enterprise side 402 only communicates to the computing server 130 and the MPC nodes through the first API 420 and query engine 422. In some embodiments, the external communications are routed through the computing server side 404.

In some embodiments, the cloud computing side 406 includes the architecture for executing multiple MPC nodes 440. The MPC nodes 440 may share some common operation parameters so that the MPC nodes 440 can cooperatively perform various types of MPC operations. Each MPC node 440 may also include individual node-specific parameters so that each MPC node 440 operates independently from another MPC node 440 to avoid the MPC nodes 440 sharing a single point of vulnerability.

In some embodiments, an MPC node 440 may be executed in a secure enclave 442. A secure enclave 442 may take the form of a hardware-based security technology that provides a trusted execution environment for protecting sensitive data and executing secure operations. The secure enclave 442 may be designed to be isolated and separate from the main operating system and other applications, creating a secure container, such as in the form of a secure virtual machine. The secure enclave 442 may be executed by memory and one or more processors of cloud infrastructure. Common cloud infrastructure provider, such as AMAZON AWS, provides a secure enclave service, such as AWS NITRO. In a secure enclave, the operation performed is not accessible or visible to the cloud infrastructure provider so that the MPC nodes 440 that are executed in the secure enclave 442 are not subject to attack from the cloud service provider or share the same point of vulnerability as the cloud service provider.

In some embodiments, a secure enclave 442 may require an injection of executable instructions to establish an operating system image for executing a virtual machine 444 that is executed by the secure hardware (memory and processors) that is provided by the cloud infrastructure provider. The secure enclave 442 executes the virtual machine 444 based on the operating system image that is injected into the secure enclave 442 and erases the content in the secure enclave 442 after the virtual machine 444 is shut down or ceases to operate. As such, from the perspective of operating an MPC node 440, the memory of the secure enclave 442 is associated with non-persistent storage that erases any content in the memory the MPC node 440 is terminated. An MPC node 440 is executed in the secure enclave 442 and includes executable instructions injected in the secure enclave 442 to create an execution environment, such as the virtual machine 444, although another type of virtualization or execution environment is also possible.

In some embodiments, the establishment of the execution environment of an MPC node 440 may be carried through a bootstrapping process where a bootstrapping package is injected into the secure enclave 442 and one or more configuration parameters in the form of different parts of a configuration file are fetched from various sources to establish the operating system image of the MPC node 440. In some embodiments, each MPC node 440 is executed in a separate instance of a secure enclave 442. Each MPC node 440 is established in the respective instance of the secure enclave 442 based on a configuration file that includes common parameters and node-specific parameters. In some embodiments, the configuration file of a particular MPC node 440 may be combined from multiple parts. Some parts are sensitive and encrypted, while other parts are shared parameters that allow the MPC nodes 440 cooperatively execute an MPC operation. For example, the various parts of the configuration file may include an encryptor key file that is uniquely associated with a particular MPC node 440, a node-specific configuration part, and a common configuration part. The encryptor key file and the node-specific configuration part may be saved in the respective instance of the secure store 448 of the cloud computing side 406. Further detail on the division of the configuration file and the deployment of MPC nodes is discussed in association with FIGS. 7A and 7B.

An MPC node 440 may perform a key ceremony process that includes an attestation process to ensure the execution environment of the secure enclave 442 is secured and untampered before an MPC operation is carried out. Since the operating image and configuration file of an MPC node 440 is injected into the secure enclave 442 from an external source, even though the secure enclave 442 may be a secure environment, the executable instructions may have been tampered with before injected into the secure enclave 442, thereby creating a vulnerability to the MPC architecture. In some embodiment, each MPC node 440 may perform a key ceremony process with an attestation node 460 before a private key shard is decrypted and made available in the secure enclave 442 to perform any MPC operation. Each secure enclave 442 may be associated with its own attestation node 460. Detail of the key ceremony process is further discussed in association with FIG. 5 through FIG. 6C.

An MPC operation may be a cryptographic operation that allows multiple MPC node 440 to jointly compute an operation over the node's respective unshared information without revealing the information to another node. Although an MPC operation may be any computations that follow the MPC protocol, typically, an MPC operation is associated with a cryptographic operation that ensures the security of an operation. For example, the MPC nodes 440 may carry out an MPC operation to cryptographically sign an operation by generating a digital signature using a private key that is broken into multiple key shards. In some embodiments, each MPC node 440 may be in possession of a key shard but not the entire private key, which is not combined or possessed by a single node or party. As such, a private cryptographic key may be secured and stored as key shards. Another example of MPC operation may be the use of a private key that is computed from multiple key shards to decrypt encrypted data. For example, an external source may encrypt data using the public key corresponding to the private key whose key shards are stored. The encrypted data may be routed to the MPC nodes to perform an MPC operation to decrypt and authenticate the data.

The on-premises multi-party computation architecture 400 allows an enterprise to manage an MPC architecture using a deployment method and architecture developed by the computing server 130. The on-premises multi-party computation architecture 400 allows the enterprise to perform various secure operations using MPC computations. A blockchain operation is going to be used as an example in FIG. 4 to illustrate a process using the on-premises MPC architecture 400, but other processes outside of the blockchain area that include the use of MPC technology are also possible to do in a similar fashion using the on-premises MPC architecture 400, such as in secure voting, other financial and economic applications, privacy-preserving data analysis, fraud detection, cybersecurity, and secure computing outsourcing.

By way of example, an enterprise end user, such as an employee, may initiate a blockchain operation request, such as sending a quantity of a blockchain unit to another blockchain address from the enterprise's blockchain address. The enterprise's blockchain address may correlate to a public key of the enterprise whose corresponding private key is stored as key shards in the MPC nodes 440. The end user may initiate the blockchain operation request through the front-end user interfaces 410.

Upon receiving the blockchain operation request, the approval service 412 may examine relevant authorization policies that are applicable to the blockchain operation request to determine whether the requestor is authorized to perform the blockchain operation. The authorization policy may specify that the operation requires multiple parties' authorizations, such as from a manager of the requestor and/or a financial administrator of the enterprise. The first API 420 may work with the computing server 130 to complete the multi-party authorization process. For example, authorization and approval requests may be sent to various user devices 110 of the approvers. Detail of various examples of authorization processes is further discussed in U.S. patent application Ser. No. 18/196,103, entitled "Blockchain Operation Authorization and Verification," which is incorporated by reference herein for all purposes.

Assuming the authorization process is completed or approved, the enterprise side 402 may send a query to the MPC nodes 440 through the query engine 422 to ask for a cryptographic signature generated by the private key of the enterprise. The MPC nodes 440 may perform an MPC operation using key shards respectively possessed by the MPC nodes 440 to generate, in a signature creation process, a cryptographic signature for a broadcast payload of a blockchain operation. The signed payload may be transmitted through the first API 420 to the computing server 130. The computing server 130 broadcasts the signed broadcast payload to the targeted blockchain on behalf of the enterprise.

Example Key Ceremony Architecture

Figure 5:
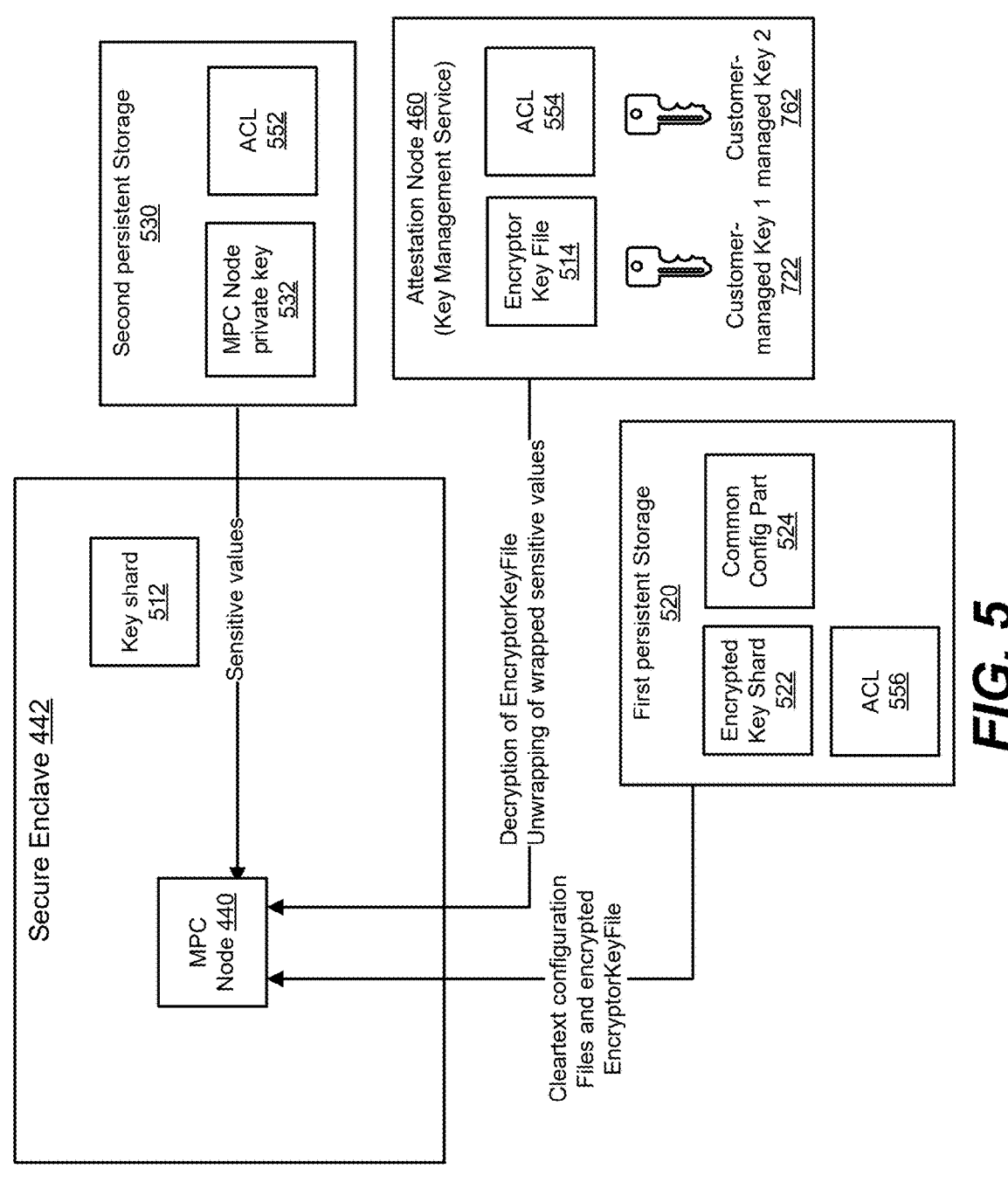
FIG. 5 is a block diagram illustrating an example architecture of a multi-party computation node, in accordance with some embodiments.

FIG. 5 is a block diagram illustrating an example architecture 500 of an MPC node 440, in accordance with some embodiments. For an MPC operation, two or more MPC nodes 440 (e.g., three MPC nodes 440) may be used to jointly perform an MPC operation. The architecture 500 may represent an example of an instance of MPC node 440 shown in the cloud computing side 406 of the on-premises multi-party computation architecture 400. Other instances of MPC node 440 have the same architecture and are associated with their own node-specific parameters.

In some embodiments, the architecture 500 of an MPC node 440 may include a secure enclave 442 that executes an MPC node 440, an attestation node 460 in communication with the secure enclave 442, a first persistent storage 520, and a second persistent storage 530. In various embodiments, the architecture 500 may include additional, fewer, or different components. For example, the two persistent storages 530 may be combined, or there can be more than two different types of persistent storages 530 that have different levels of security specifications. The security of each component may further be enforced by the component's access control list (ACL), such as ACLs 552, 554, and 556.

The secure enclave 442 is a secure environment that prevents any administrators outside of the secure enclave 442, including the administrators of the cloud service provider, from gaining access to the data or process of the execution environment of the secure enclave 442. The operating system image of the MPC node 440 and the configuration file are injected into the secure enclave 442 and an attestation process is performed to carry out an attestation check on the execution environment of the secure enclave 442. The attestation check may be performed initially when the execution environment of an MPC node 440 is booted up. The attestation check may also be performed periodically to ensure the continued security of the secure enclave 442. An example of a secure enclave 442 may be AMAZON AWS NITRO.

The attestation node 460 may take the form of another secure environment that prevents any administrators outside of the secure enclave 442, including the administrators of the cloud service provider, from gaining access to the data or process of the attestation node 460. The attestation node 460 may be used to verify the attestation check and allows the secure enclave 442 to start substantive operations after the attestation process is approved. For example, in some embodiments, the attestation node 460 is in secured possession of an attestation private key that can be used to decrypt one or more parameters and/or files that are needed for the MPC node 440 to operate. The exact types of parameters and files that may be decrypted by the attestation node may depend on the implementation. The discussion of an example key ceremony process below provides examples of parameters and files that are unlocked by the attestation node 460. In some embodiments, the secure enclave 442 and the attestation node 460 are in communication with each other through a secure channel, such as a channel that implements transport layer security (TLS) or another security protocol. In some embodiments, the secure channel is proof against man-in-the-middle attacks.

In some embodiment, in MPC systems that include multiple MPC nodes 440, each secure enclave 442 may be associated with a separate instance of an attestation node 460 that has its own attestation private key. An example of an attestation node 460 may be AMS key management service (KMS). In some embodiments, the attestation node 460 may also be used to persistently store one or more encrypted key files. The key files may be decrypted upon satisfying conditions set by the attestation node 460. In some embodiments, the attestation node 460 may also be referred to as a key management node.

The first persistent storage 520 and the second persistent storage 530 are persistent storages (e.g., data stores) that have different levels of security for storing different types of data. Various configuration parameters, encryption files such as keys, key shards, and data may be stored in various persistent storages in encrypted or unencrypted form, depending on the sensitivity level of the data or file. Sensitive data may be stored directly in a secure persistent storage or may be encrypted and stored in any persistent storage. For example, a key shard may be encrypted and stored in the first persistent storage 520. In comparison, the first persistent storage 520 may have a lower security level than the second persistent storage 530. For instance, the first persistent storage 520 may be a common data store such as AMAZON S3 or another common cloud storage service. The second persistent storage 530 may be a secure data store that specializes in storing sensitive values. For example, the second persistent storage 530 may be used to securely store secure key-value pairs. In some embodiments, an example of the second persistent storage 530 may be AWS SECRETS MANAGER.

In executing an MPC node 440, there are different types of files and data that need to be provided to the secure enclave 442 to establish the execution environment. The files and data may be stored in encrypted or decrypted forms in various embodiments. For example, each MPC node 440 may be assigned to work with a particular key shard 512 that is part of a private cryptographic key. Since the secure enclave 442 does not store data persistently, the key shard 512 needs to be stored permanently outside of the secure enclave 442. In some embodiments, the key shard 512 is stored in an encrypted form as an encrypted key shard 522 in the first persistent storage 520. While a key shard is used as an example of a secret part that an MPC node 440 uses, in other embodiments, instead of or in addition to storing a key shard, the MPC node 440 may also store another form of secret. The discussion of key shards in this disclosure may also be applied to another form of secret in an MPC operation.

In some embodiments, the files and data that need to include to execute an MPC node 440 may also include an encryptor key file 514, which may be a cryptographic key that is used to encrypt the key shard 512. In some embodiments, the encryptor key file 514 is a symmetric key that can be used to encrypt and decrypt the same data. For example, the encryptor key file 514 may be used to encrypt the key shard 512 and to decrypt the encrypted key shard 522. In some embodiments, the encryptor key file 514 is stored in the attestation node 460 in an encrypted form and is decryptable by the attestation private key of the attestation node 460. In some embodiments, the encryptor key file 514 is protected by the attestation process of the secure enclave 442 executing the MPC node 440 so that the attestation node 460 will not decrypt the encryptor key file 514 unless the attestation result is verified. The plaintext of the of encryptor key file 514 is used to encrypt and decrypt the key shard and other sensitive node-specific parameters of the MPC node 440. In some embodiments, an encryptor key file 514 is uniquely associated with a particular MPC node 440. Each different MPC node 440 is associated with a different encryptor key file 514.

In some embodiments, the files and data that need to include to execute an MPC node 440 may also include a node-specific configuration part. The node-specific configuration part may include specific parameters that identify and authenticate the MPC node 440 among other MPC nodes 440. The node-specific data may also include an MPC node private key 532 that is used in secure communications among other MPC nodes. For example, the MPC node private key 532 may be used as a private key for transport layer security (TLS) communications among the MPC nodes. The MPC node private key 532 may be periodically rotated and the key rotation may be performed by the second persistent storage 530. Other node-specific parameters may also be stored as a secure key-value pair store provided by the second persistent storage 530. In some embodiments, node-specific parameters may also be encrypted and are decryptable by the encryptor key file 514.

In some embodiments, the files and data that need to include to execute an MPC node 440 may also include a common configuration part. The common configuration part 524 may include parameters that are common to multiple MPC nodes 440 so that the MPC nodes 440 are consistent in joint computation. Common configuration parameters that are insensitive may be stored in the first persistent storage 520 in plain text while more sensitive data may be stored in an encrypted form.

An MPC node 440 is started in a secure enclave 442 through a bootstrap process to fetch some of the configuration parts and operating system image to the secure enclave 442. Before the MPC node 440 is fully operational, an attestation process is carried out in the secure enclave 442 to verify and validate the integrity of the secure enclave 442 and the identity of the MPC node 440 to ensure the operating system image and the configuration parameters have not been tampered with or compromised. The attestation process may be part of a key ceremony process, which includes a set of procedures for the MPC node 440 and the attestation node 460 to follow to manage the key shard 512 securely. After the key shard 512 in decrypted form is provided to the secure enclave 442, the MPC node 440 is ready to perform an MPC operation.

In some embodiments, the initialization of an MPC node 440 may include a bootstrap process where executable instructions are injected into the secure enclave 442. The executable instructions, which may be part of a bootstrapping packing, cause the secure enclave 442 to fetch various configuration file parts from different sources, such as the attestation node 460 and the first persistent storage 520. This may include the fetch of the encrypted key shard 522, either to the secure enclave 442 or to the attestation node 460. The image of the execution environment, such as an operating system image, may also be fetched to the secure enclave 442.

As part of the key ceremony process, in some embodiments, the secure enclave 442 performs an attestation check on the execution environment. In various embodiments, different ways of attestation checks may be performed to verify the integrity of the execution environment. For example, the attestation check may include generating a quote that contains integrity check values of the execution environment. Examples of the integrity check values may include the state information of the execution environment of the secure enclave 442. The integrity check values in the quote should match the expected values, which may be stored in the attestation node 460. For example, an integrity check value may be a register counter value. For example, if any of the fetched files are tampered with, the internal register counters of the execution environment (e.g., a virtual machine) will change compared to the expected values. The matching of those register counter values may verify that the execution environment of the MPC node 440 is untampered and secure.

In some embodiments, the secure enclave 442, may generate a result of the attestation check. The result may include the integrity check values in the quote of the attestation check, such as one or more state values. As part of the attestation process, the secure enclave 442, based on the executable instructions injected, may create a cryptographic signature on the result of the attestation check. For example, each instance of secure enclave 442 may be associated with a secure enclave private key that is only possessed by the secure enclave 442. The cryptographic signature may be generated by the secure enclave 442 signing the integrity check values of the execution environment using the secure enclave private key. The cryptographic signature may be part of an attestation certificate. The attestation certificate that includes the cryptographic signature of the attestation check is transmitted to the attestation node 460.

In some embodiments, the attestation payload that is transmitted to the attestation node 460 may include the integrity check values that are identified in the attestation check, the public key of the secure enclave 442, an attestation certificate that includes the cryptographic signature that is generated by the private cryptographic key of the secure enclave 442, any other certificate chain to the attestation certification, and digital signatures of various components in the attestation payload.

In some embodiments, as part of the key ceremony process, the attestation node 460 may receive the attestation payload that includes the result of the attestation check, various certificates, and signatures. The attestation node 460 may verify the cryptographic signature and the integrity check values in the attestation check. If the integrity check values match the expected value and the signature(s) are authenticated, the attestation is verified. Upon successful verification, the attestation node 460 causes the decryption of the encrypted key shard 522 to generate a decrypted key shard. The decrypted key shard may be used by the MPC node 440 to perform part of an MPC operation, such as generating a cryptographic signature or decrypting data. In some embodiments, the cryptographic signature is time bound to for a valid period and the attestation check is performed periodically. For example, the attestation certificate may be valid for two hours.

In some embodiments, the decryption of the encrypted key shard 522 may be performed either at the attestation node 460 or the secure enclave 442. After the cryptographic signature of the attestation check is verified, the attestation node 460 may decrypt the encryptor key file 514 using the attestation private key of the attestation node 460. The encryptor key file 514 may be transmitted to the secure enclave 442 or be retained at the attestation node 460. The encryptor key file 514 may be used to decrypt one or more configuration data for the MPC node 440. At any point, the key ceremony process may include the attestation node 460 or the secure enclave 442 fetching the encrypted key shard 522 from the first persistent storage 520 to the secure environment. The encryptor key file 514 may also be used to decrypt the encrypted key shard 522 to generate the key shard 512. The key shard 512 may then be used in the MPC operations. The key shard 512 is specific to a particular MPC node 440. Other MPC nodes 440 have their own respective key shard 512. The MPC nodes 440 are in communication with each other through a secure channel such as a channel using TLS and TLS key rotation. In some embodiments, the key shard 512 of any MPC node 440 does not leave the corresponding secure enclave 442. The key shards 512 of the MPC nodes 440 are not exchanged. Using MPC technology, the cryptographic signature of the private key corresponding to the key shards 512 is generated.

Example Key Ceremony Message Flow

Figure 6A:
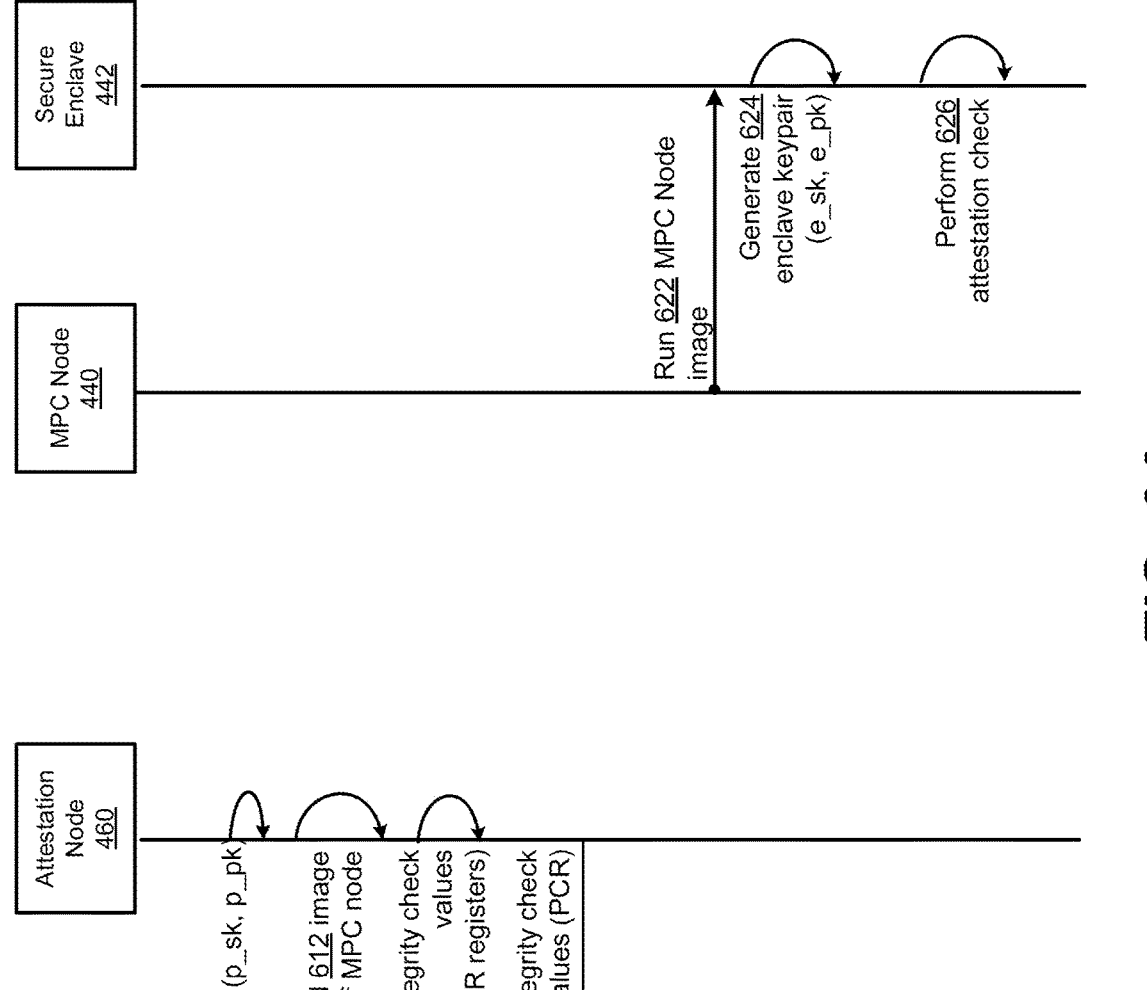
FIGS. 6A and 6B are sequence diagrams illustrating an example series of a key ceremony process, in accordance with some embodiments.
Figure 6B:
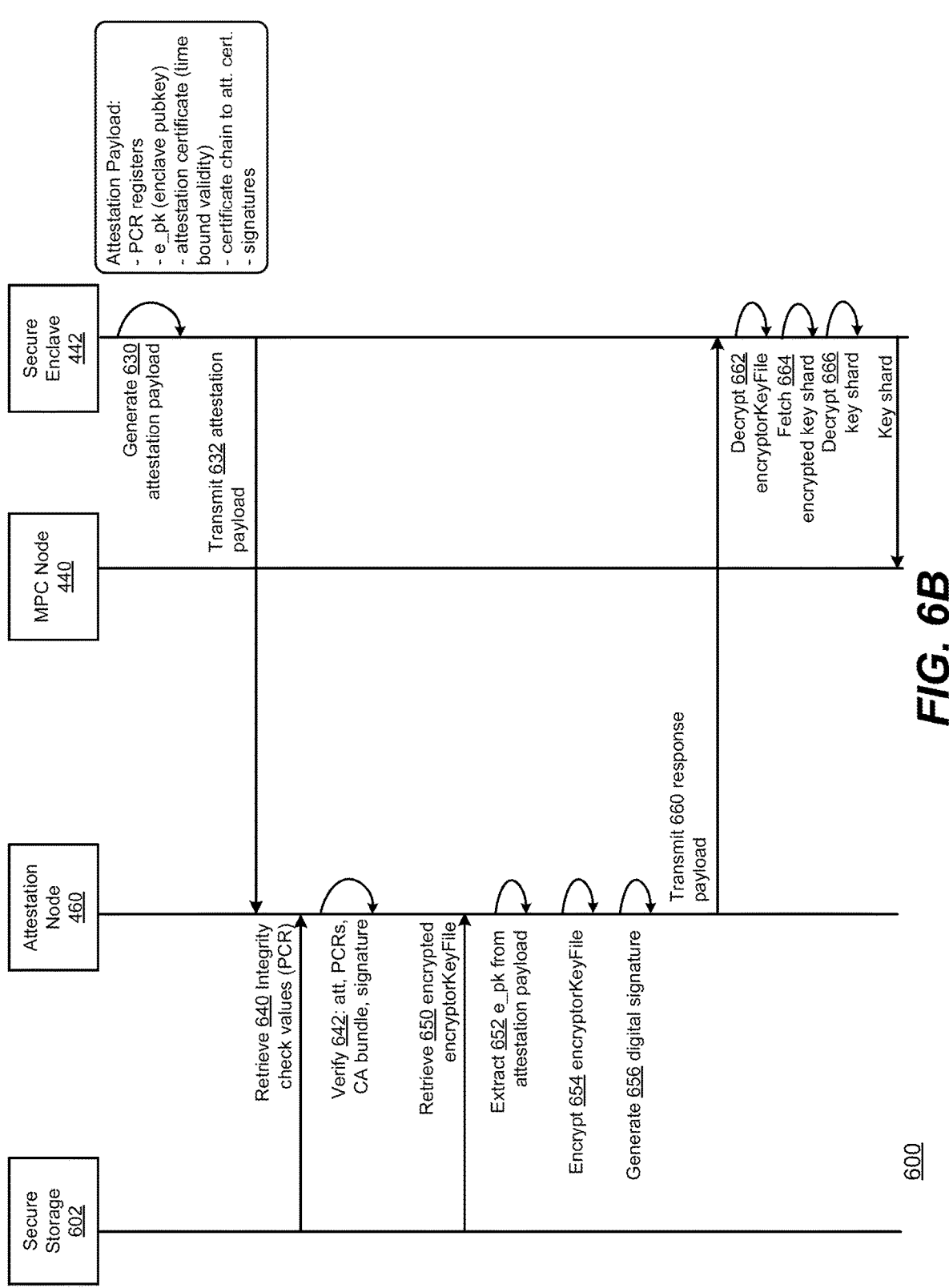

FIGS. 6A and 6B are sequence diagrams illustrating an example series 600 of a key ceremony process that involves interactions among various components in using an MPC node 440, in accordance with some embodiments. The series 600 represents specific sets of instructions that may be stored in one or more computer-readable media, such as memory of different components. The instructions, when executed by one or more processors, cause one or more processors to perform the described interactions. As depicted in FIGS. 6A and 6B, the series 600 is performed by an attestation node 460, a secure storage 602 of the attestation node 460, an MPC node 440, and a secure enclave 442.

The series 600 is depicted in FIGS. 6A and 6B is merely an example of a sequence of interactions. In other embodiments the sequence of interactions may include fewer, additional, or different actions performed by the same or different components. While the steps in series 600 are illustrated graphically in FIGS. 6A and 6B as sequences of steps, some of the steps may occur in different sequences than illustrated or may occur concurrently with other steps. Also, while series 600 is depicted as a single series, in various embodiments and situations the series 600 may be further broken down into multiple series 600.

Referring to FIG. 6A, the attestation node 460 may be initially set up to store integrity check values that can be used to check the execution environment of an MPC node 440. The attestation node 460 may generate 610 of its own cryptographic key pairs that are used for authentication and secure communication of the attestation node 460. The cryptographic key pair associated with the attestation node 460 may be referred to as an attestation private key and a corresponding attestation public key. The attestation node 460 may also build 612 a part of an image of the MPC node 440. Using the initial image, the attestation node 460 may compute 614 integrity check values, such as register counter values in the image. The attestation node 460 may store 616 of the integrity check values in the secure storage 602 of the attestation node 460.

In a key ceremony process, a virtual machine of the MPC node 440 may cause the secure enclave 442 to run 622 the MPC node image. The secure enclave 442 is associated with its own cryptographic key pairs that are used for authentication and secure communication of the secure enclave 442. At some points before or during the key ceremony process, the secure enclave 442 may generate 624 the private cryptographic key and the corresponding public cryptographic key. The key pairs may be referred to as the enclave private key and the enclave public key. The secure enclave 442 may perform 626 an attestation check to determine the integrity check values as reflected in the execution environment of the MPC node image.

The secure enclave 442 may generate 630 an attestation payload, which may include the integrity check values that are identified in the attestation check, the enclave public key, an attestation certificate that includes the cryptographic signature that is generated by the enclave private cryptographic key, any other certificate chains to the attestation certification, and digital signatures of various components in the attestation payload. The secure enclave 442 may transmit 632 the attestation payload to the attestation node 460.

In response, the attestation node 460 may retrieve 640 integrity check values from the secure storage 602. The attestation node 460 may verify 642 the information in the attestation payload, including authenticating any digital signature, matching the integrity check values measured from the MPC node execution environment to the integrity check values retrieved from the secure storage 602, and verifying any certificates. Upon successful verification, the attestation node 460 may extract the enclave public key that may be sent as part of the attestation payload package.

The attestation node 460 may also retrieve 650 an encrypted encryptor key file 514 (which is originally encrypted by the attestation public key) and decrypt the encryptor key file 514 using the attestation private key. The attestation node 460 may extract 652 the enclave public key that is in the attestation payload package. The attestation node 460 may encrypt 654 the encryptor key file 514 using the enclave public key and use the encrypted encryptor key file 514 (which now is encrypted by the enclave public key) as a response payload. The attestation node 460 may also generate 656 a digital signature using the attestation private key as part of the response payload.

The response payload may be transmitted 660 to the secure enclave 442. The secure enclave 442 uses the enclave private key to decrypt 662 the encryptor key file 514. The secure enclave 442 also fetches 664 an encrypted key shard 522 from an external source, such as attestation node 460. The secure enclave 442 uses the encryptor key file 514 to decrypt 666 the encrypted key shard 522 to generate the key shard 512, which is used in MPC operations.

In some embodiments, instead of transmitting the encrypted encryptor key file 514 to the secure enclave 442, the attestation node 460 may also fetch the encrypted key shard 522 and directly decrypt the encrypted key shard 522. In turn, the attestation node 460 encrypts the key shard 512 again using the enclave public key and transmits the encrypted key shard to the secure enclave 442. The secure enclave 442 may decrypt the key shard using the enclave private key.

Example Node Deployment Process

Figure 7A:
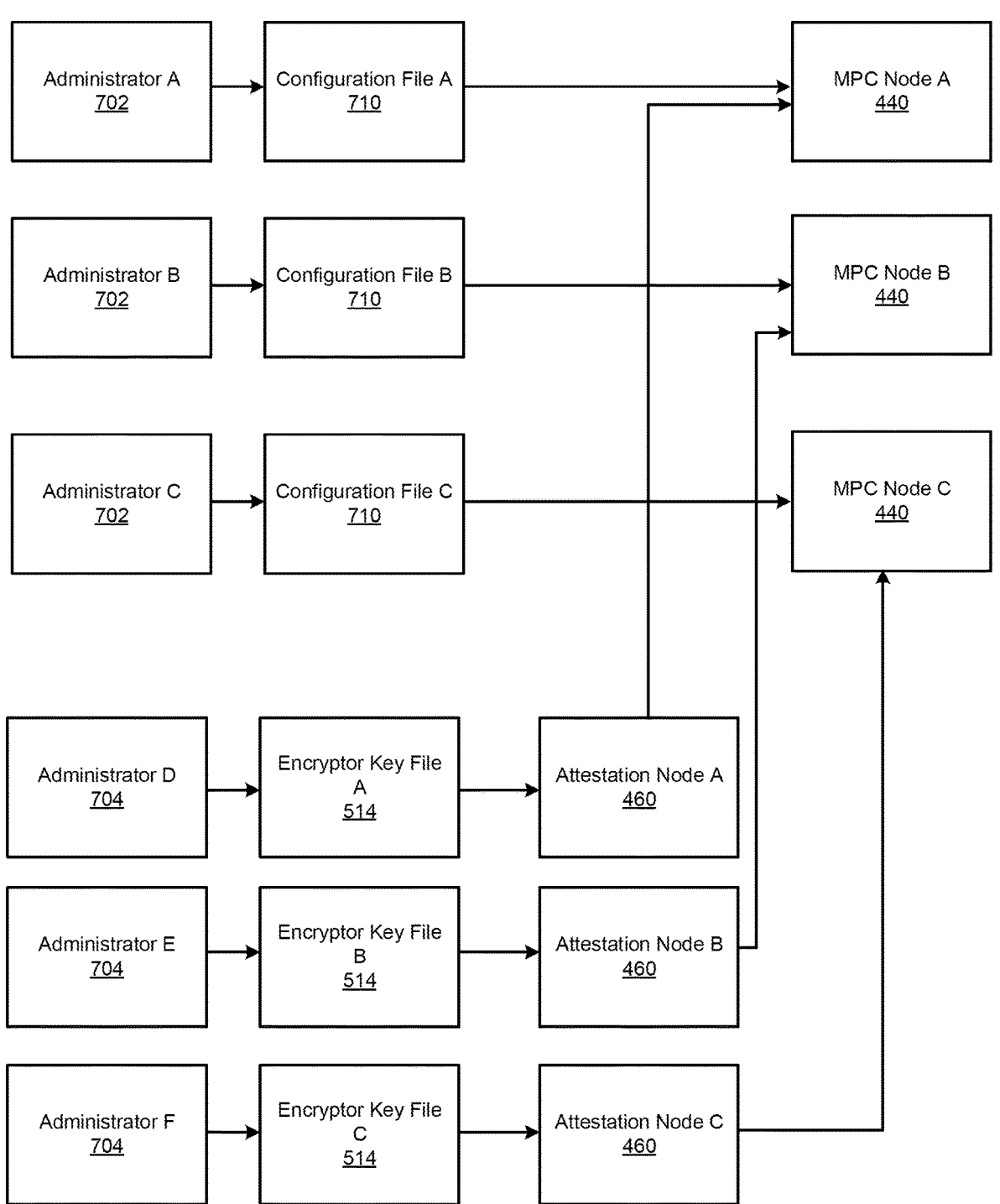
FIG. 7A is a block diagram illustrating a deployment process for multi-party computation nodes to be used in an enterprise setting, in accordance with some embodiments.
Figure 7B:
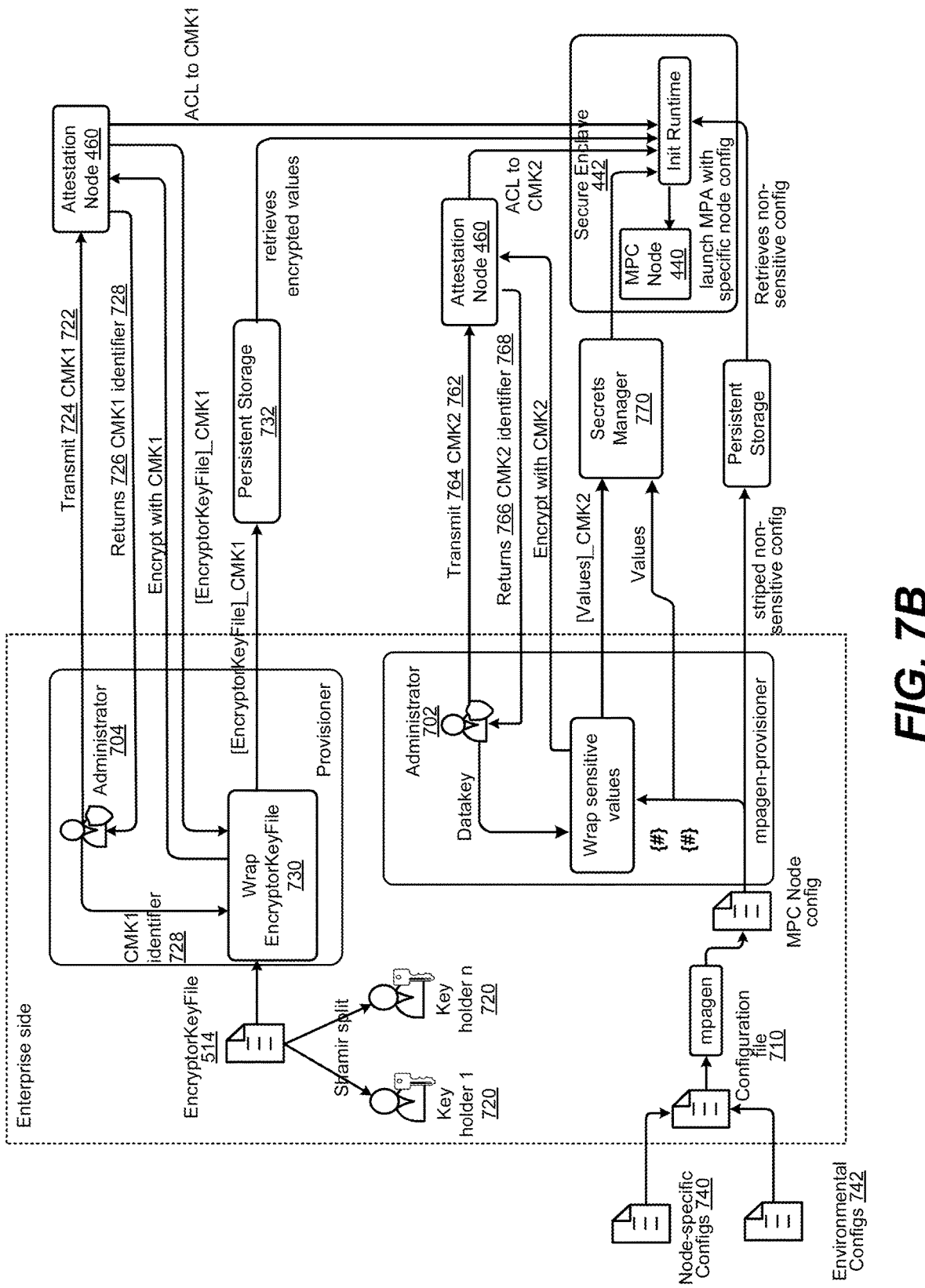
FIG. 7B is a block diagram illustrating a message flow in deploying one of the multi-party computation nodes, in accordance with some embodiments.

FIG. 7A is a block diagram illustrating a deployment process for MPC nodes 440 to be used in an enterprise setting, in accordance with some embodiments. FIG. 7B is a block diagram illustrating a message flow in deploying one of the MPC nodes 440, in accordance with some embodiments. Other nodes in the MPC system may be deployed in a similar fashion as illustrated in FIG. 7B with the node's own set of node-specific parameters, secrets, and keys.

Referring to FIG. 7A, the deployment process may involve the computing server 130 supplying code, parameters and secrets to an enterprise through one or more independent administrators of the enterprise. In some embodiments, the deployment of an MPC node 440 may include the transmission of a configuration file 710 and an encryptor key file 514. The configuration file 710 and the encryptor key file 514 may be delivered to two different administrators. For example, for each MPC node 440, the configuration file 710 is delivered to a separate administrator. The configuration file 710 for each MPC node 440 may include common parts and node-specific parameters so that each configuration file 710 is different from another. The encryptor key file 514, which may also be different for each MPC node 440, may be separately delivered to other administrators to reduce the common point of vulnerability in deploying the MPC system.

The computing server 130 may provide one or more encryptor key files 514 to one or more administrators 704 of the enterprise. For example, each MPC node 440 may be assigned an individual encryptor key file 514. The encryptor key file 514 is backed up and is also installed at a key management service of a cloud provider. For example, the key management service may be part of an attestation node 460. Each encryptor key file 514 may be uploaded to a separate key management service. The enterprise may also generate an enterprise private key that is separated into key shards. Each key shard may be respectively encrypted by one of the encryptor key files 514 and be stored.

With respect to configuration file 710, the file may be separated into multiple parts that will be further illustrated in FIG. 7B. The computing server 130 may directly upload the parts of the configuration file 710 to the respective destination in cloud storage, such as the attestation node 460, the first persistent storage 520, and the second persistent storage 530. The parts may be uploaded in encrypted forms. An administrator 702 of the enterprise may be supplied by the computing server 130 with an API key that may be used to access the relevant configuration file parts and to authenticate the administrator 702 before the configuration file parts are decrypted and injected into a secure enclave 442. After the authentication of the administrator 702, the secure enclave 442 may perform a key ceremony process as discussed in FIG. 5 through FIG. 6C and initiate an MPC node 440.

Referring to FIG. 7B, an example of a detailed message flow of deployment of one of the MPC nodes 440 is illustrated, in accordance with some embodiments. An encryptor key file 514 is generated, either by an enterprise itself or by computing server 130. The encryptor key file 514 is provided to a privileged administrator 704. Also, at the initial generation, the encryptor key file 514 may also be backed up using a Shamir split and the splits of the encryptor key file 514 are provided to several key holders 720. The administrator 704 may generate or be provided with a customer-managed key 722. The customer-managed key 722 is transmitted 724 to the attestation node 460, which returns 726 a resource identifier 728 that is used to identify the customer-managed key 722. The administrator 704 encrypts the encryptor key file 514 with the customer-managed key 722 to generate a wrapped encryptor key file 730. The wrapped encryptor key file 730 is associated with the resource identifier 728. The wrapped encryptor key file 730 is stored in a persistent storage 732 such as an S3 bucket.

The configuration file 710 includes several parts, such as node-specific configurations 740 and common configurations that may be referred to as environmental configurations 742. The parts of the configuration file 710 can be combined or divided using a provisioner tool such as "mpagen". In some embodiments, the configuration parts may include the node private key of the MPC node 440 for TLS communication among MPC nodes in the cluster. This may be a node-specific file that may be periodically rotated. In some embodiments, the configuration parts may also include blockchain services-related configuration, which may be part of the environmental configuration 742. In some embodiments, the configuration parts may also include message broker and MPC node persistent database configurations. These parameters may be node specific. In some embodiments, the configuration parts may also include a callback public key and an emergency recovery system public key. Some configuration parameters may be frequently changed.

The configuration file 710 can be split into several files and loaded by specifying a comma-separated file list (or another suitable format). Other configuration values can be loaded from environmental configuration 742. The sensitive and/or static part of the 710 may be protected by secure enclave 442 cryptographic attestation and/or authorization policy such as an access control list. The node-specific configuration 740 may be encrypted and/or stored in a secret manager.

Other common or dynamic configuration parameters that could be updated on a relatively regular basis may be stored as environmental configurations 742. Non-sensitive values may be stored in regular storage, such as the first persistent storage 520.

The configuration file 710 of a particular MPC node 440 may be managed by an administrator 702. The administrator 702 may generate or be provided with a second customer managed key 762. The second customer managed key 762 is transmitted 764 to a key management service, such as an attestation node 460, which returns 766 a second resource identifier 768 that is used to identify the second customer managed key 762. The sensitive configuration parameters, such as the node-specific configurations 740, may be encrypted with the second customer managed key 762 before it is stored in persistent storage. In some embodiments, some secret parameters may also be directly stored in a secrets manager 770, such as a secret key-value pair store.

In the runtime of an MPC node 440, the wrapped encryptor key file 730, the node-specific configurations 740, and the environmental configurations 742, along with various resource identifiers, are injected into the secure enclave 442 to perform a key ceremony process.

Example Blockchain Architecture

Figure 8A:
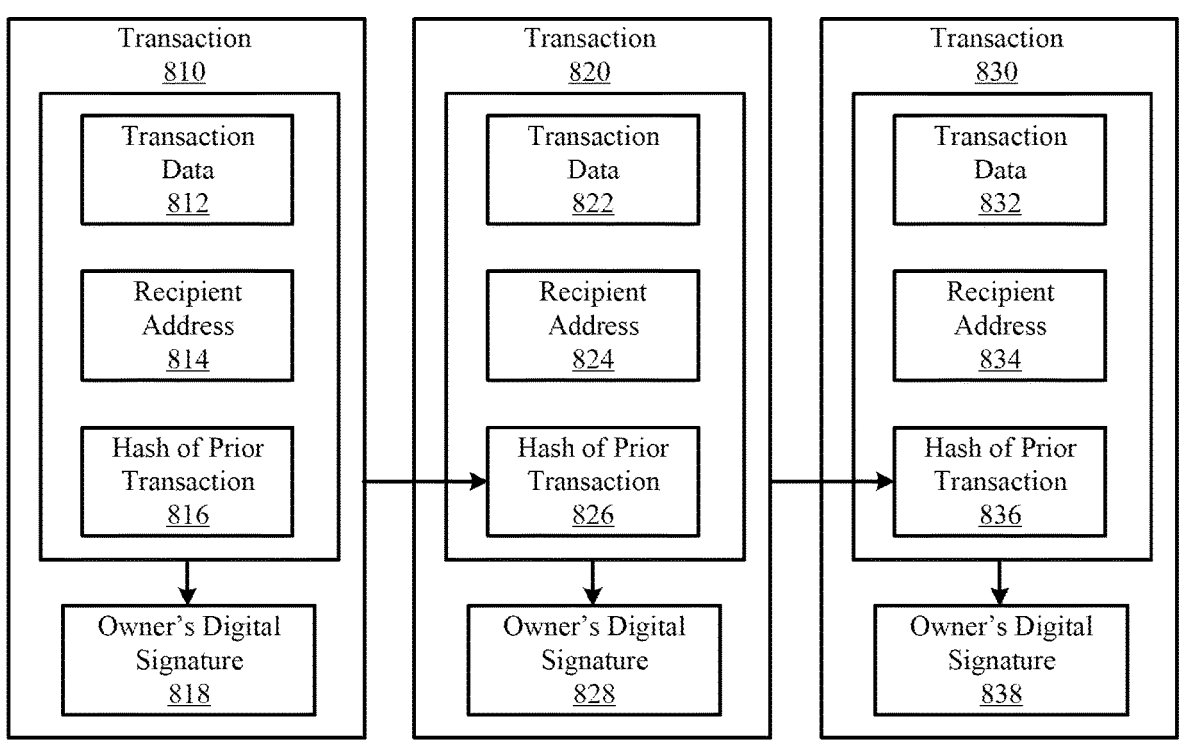
FIG. 8A is a block diagram illustrating a chain of transactions broadcasted and recorded on a blockchain, in accordance with some embodiments.

FIG. 8A is a block diagram illustrating a chain of transactions broadcasted and recorded on a blockchain, in accordance with some embodiments. The transactions described in FIG. 8A may correspond to any of the transactions and the transfer of blockchain-based units. A blockchain-based unit can be a cryptocurrency, a token, an NFT, a wrapped token, etc.

In some embodiments, a blockchain is a distributed system. A distributed blockchain network may include a plurality of blockchain nodes. Each blockchain node is a user or a server that participates in the blockchain network. In a public blockchain, any participant may become a blockchain node of the blockchain (permissionless). The blockchain nodes collectively may be used as a computing system that serves as a virtual machine of the blockchain. In some embodiments, the virtual machine or a distributed computing system may be simply referred to as a computer. Any blockchain node of a public blockchain may broadcast transactions for the nodes of the blockchain to record. Each digital wallet is associated with a private cryptographic key that is used to sign transactions and proves the ownership of a blockchain-based unit.

The ownership of a blockchain-based unit may be traced through a chain of transactions. A transaction may be referred to as a blockchain operation, which may include a transfer of a cryptocurrency or a token, creation of a token, recordation of an autonomous program protocol (e.g., a smart contract), execution of the autonomous program protocol, and another decentralized application operation. In FIG. 8A, a chain of transactions may include a first transaction 810, a second transaction 820, and a third transaction 830, etc. The transactions in FIG. 8A are typically recorded in the ledger of the blockchain. Each of the transactions in the chain may have a fairly similar structure except the very first transaction in the chain. The first transaction of the chain may be generated by a smart contract or a mining process and may be traced back to the smart contract that is recorded on the blockchain or the first block in which the blockchain-based unit was generated. While each transaction is illustrated as linking to a prior transaction in FIG. 8A, the transaction does not need to be recorded on consecutive blocks on the blockchain. For example, the block recording the transaction 810 and the block recording the transaction 820 may be separated by hundreds or even thousands of blocks. In some embodiments, the traceback of the prior block may be tracked by the hash of the prior block that is recorded by the current block. In other blockchains, there are no links among the transactions. The transactions are simply ordered temporally on the ledger that includes a number of blocks. For example, in some embodiments, an account model is used and transactions do not have any references to previous transactions. In those blockchains, transactions are not chained and do not contain the hash of the previous transaction.

Referring to one of the transactions in FIG. 8A, for illustration, the transaction 820 may be referred to as a current transaction. Transaction 810 may be referred to as a prior transaction and transaction 830 may be referred to as a subsequent transaction. Each transaction includes a transaction data (e.g., transaction data 812, 822, and 832), a recipient address (e.g., recipient address 814, 824, and 834), a hash of the prior transaction (e.g., hash of prior transaction 816, 826, and 836), and the current transaction's owner's digital signature (e.g., owner's digital signature 818, 828, and 838). The transaction data 822 records the substance of the current transaction 820. For example, the transaction data 822 may specify a transfer of a quantity of a blockchain-based unit (e.g., a coin, a blockchain token, etc.). In some embodiments, the transaction data 822 may include code instructions of a smart contract.

In some embodiments, the recipient address 824 is a version of the public key that corresponds to the private key of the digital wallet of the recipient. In one embodiment, the recipient address 824 is the public key itself. In another embodiment, the recipient address 824 is an encoded version of the public key through one or more functions such as some deterministic functions. For example, the generation of the recipient address 824 from the public key may include hashing the public key, adding a checksum, adding one or more prefixes or suffixes, encoding the resultant bits, truncating the address, and/or other suitable algorithmic operations. The recipient address 824 may be a unique identifier of the digital wallet of the recipient on the blockchain.

The hash of the prior transaction 826 may be the hash of the entire transaction data of the prior transaction 810. Likewise, the hash of the prior transaction 836 is the hash of the entire transaction data of the transaction 820. The hashing of the prior transaction 810 may be performed using a hashing algorithm such as a secure hash algorithm (SHA) or a message digest algorithm (MD). In some embodiments, the owner corresponding to the current transaction 820 may also use the public key of the owner to generate the hash. The hash of prior transaction 826 provides a traceback of the prior transaction 810 and also maintains the data integrity of the prior transaction 810.

In generating a current transaction 820, the digital wallet of the current owner of the blockchain-based unit may use its private key to encrypt the combination of the transaction data 822, the recipient address 824, and the hash of prior transaction 826 to generate the owner's digital signature 828. To generate the current transaction 820, the current owner may specify a recipient by including the recipient address 824 in the digital signature 828 of the current transaction 820. The subsequent owner of the blockchain-based unit is fixed by the recipient address 824. In other words, the subsequent owner that generates the digital signature 838 in the subsequent transaction 830 is fixed by the recipient address 824 specified by the current transaction 820. To verify the validity of the current transaction 820, any nodes in the blockchain network may trace back to the prior transaction 810 (by tracing the hash of prior transaction 826) and locate the recipient address 814. The recipient address

814 corresponds to the public key of the digital signature 828. Hence, the nodes in the blockchain network may use the public key to verify the digital signature 828. Hence, a current owner who has the blockchain-based unit tied to the owner's blockchain address can prove the ownership of the blockchain-based unit. In this disclosure, it can be described as the blockchain-based unit being connected to a public cryptographic key of a party because the blockchain address is derived from the public key. For example, the computing server 130 may own blockchain-based units. The blockchain-based units are connected to one of the public cryptographic keys of the computing server 130.

The transfer of ownership of a blockchain-based unit may be initiated by the current owner of the blockchain-based unit. To transfer the ownership, the owner may broadcast the transaction that includes the digital signature of the owner and a hash of the prior transaction. A valid transaction with a verifiable digital signature and a correct hash of the prior transaction will be recorded in a new block of the blockchain through the block generation process.

Figure 8B:
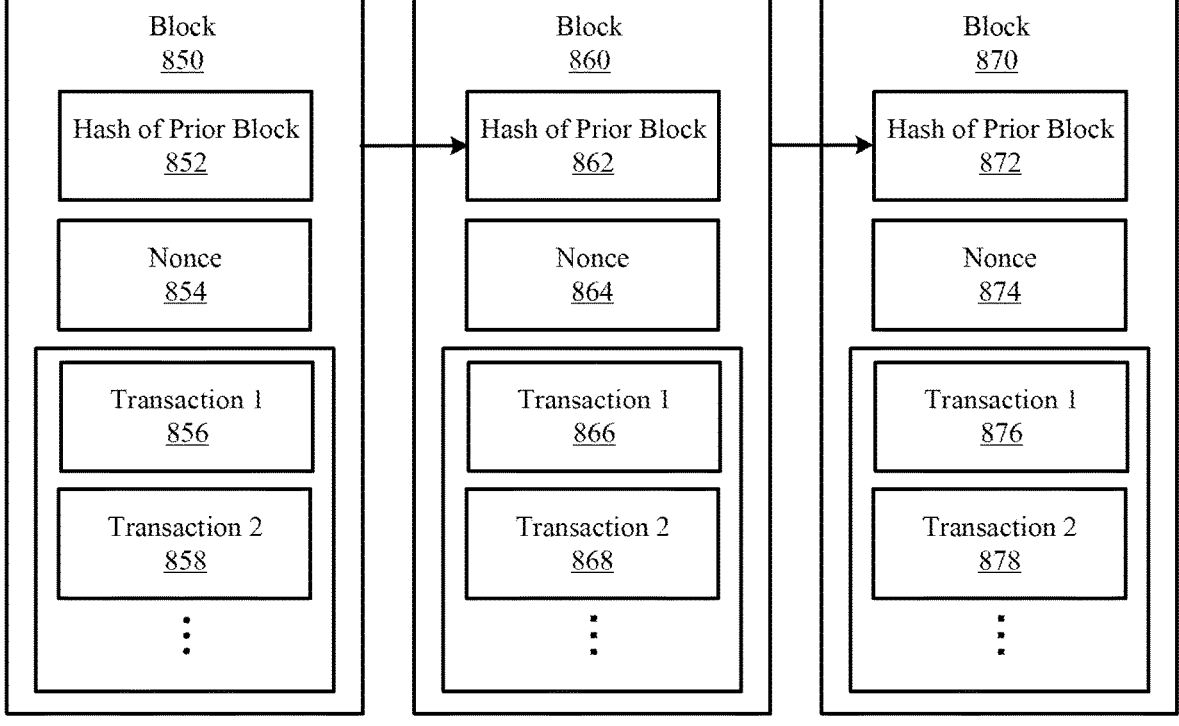
FIG. 8B is a block diagram illustrating a connection of multiple blocks in a blockchain, in accordance with some embodiments.

FIG. 8B is a block diagram illustrating a connection of multiple blocks in a blockchain, in accordance with some embodiments. Each block of a blockchain, except the very first block which may be referred to as the genesis block, may have a similar structure. The blocks together may be referred to as the ledger of the blockchain. The blocks 850, 860, and 860 may each include a hash of the prior blockchain 852, a nonce 854, and a plurality of transactions (e.g., a first transaction 856, a second transaction 858, etc.). Each transaction may have the structure shown in FIG. 8A. An autonomous program protocol may also be stored in one of the transactions and execution results of the autonomous program protocol may be stored in subsequent transactions.

In a block generation process, a new block may be generated through a consensus mechanism such as mining (e.g., proof of work) or voting (e.g., proof of stake). For a mining process of a blockchain, any nodes in the blockchain system may participate in the mining process. The generation of the hash of the prior block may be conducted through a trial and error process. The entire data of the prior block (or a version of the prior block such as a simplified version) may be hashed using the nonce as a part of the input. The blockchain may use a certain format in the hash of the prior block in order for the new block to be recognized by the nodes as valid. For example, in one embodiment, the hash of the prior block needs to start with a certain number of zeroes in the hash. Other criteria of the hash of the prior block may also be used, depending on the implementation of the blockchain.

In a voting process, the nodes in a blockchain system may vote to determine the content of a new block. Depending on the embodiment, a selected subset of nodes or all nodes in the blockchain system may participate in the votes. For example, in some embodiments, a staking process is required before a node can participate in the voting process. When there are multiple candidates new blocks that include different transactions are available, and the nodes will vote for one of the blocks to be linked to the existing block. The voting may be based on the voting power of the nodes.

By way of an example of a block generation process using mining, in generating the hash of prior block 862, a node may randomly combine a version of the prior block 850 with a random nonce to generate a hash. The generated hash is somewhat of a random number due to the random nonce. The node compares the generated hash with the criteria of the blockchain system to check if the criteria are met (e.g., whether the generated hash starts with a certain number of zeroes in the hash). If the generated hash fails to meet the criteria, the node tries another random nonce to generate another hash. The process is repeated for different nodes in the blockchain network until one of the nodes finds a hash that satisfies the criteria. The nonce that is used to generate the satisfactory hash is the nonce 864. The node that first generates the hash 862 may also select what transactions that are broadcasted to the blockchain network are to be included in the block 860. The node may check the validity of the transaction (e.g., whether the transaction can be traced back to a prior recorded transaction and whether the digital signature of the generator of the transaction is valid). The selection may also depend on the number of broadcasted transactions that are pending to be recorded and also the fees that may be specified in the transactions. For example, in some embodiments, each transaction may be associated with a fee (e.g., gas) for having the transaction recorded. After the transactions are selected and the data of the block 860 is fixed, the nodes in the blockchain network repeat the trial and error process to generate the hash of prior block 872 by trying different nonce 874 in generating a new block 870. In embodiments that use voting to generate new blocks, a nonce may not be needed. A new block may be linked to the prior block by including the hash of the prior block.

New blocks may be continued to be generated through the block generation process. A transaction of a blockchain-based unit (e.g., an electronic coin, a blockchain token, etc.) is complete when the broadcasted transaction is recorded in a block. In some embodiments, the transaction is considered settled when the transaction is considered final. A transaction is typically considered final when there are multiple subsequent blocks generated and linked to the block that records the transaction.

In some embodiments, some of the transactions 856, 858, 866, 868, 876, 878, etc. may include one or more smart contracts. The code instructions of the smart contracts are recorded in the block and are often immutable. When conditions are met, the code instructions of the smart contract are triggered. The code instructions may cause a computer (e.g., a virtual machine of the blockchain) to carry out some actions such as generating a blockchain-based unit and broadcasting a transaction documenting the generation to the blockchain network for recordation.

Computing Machine Architecture

Figure 9:
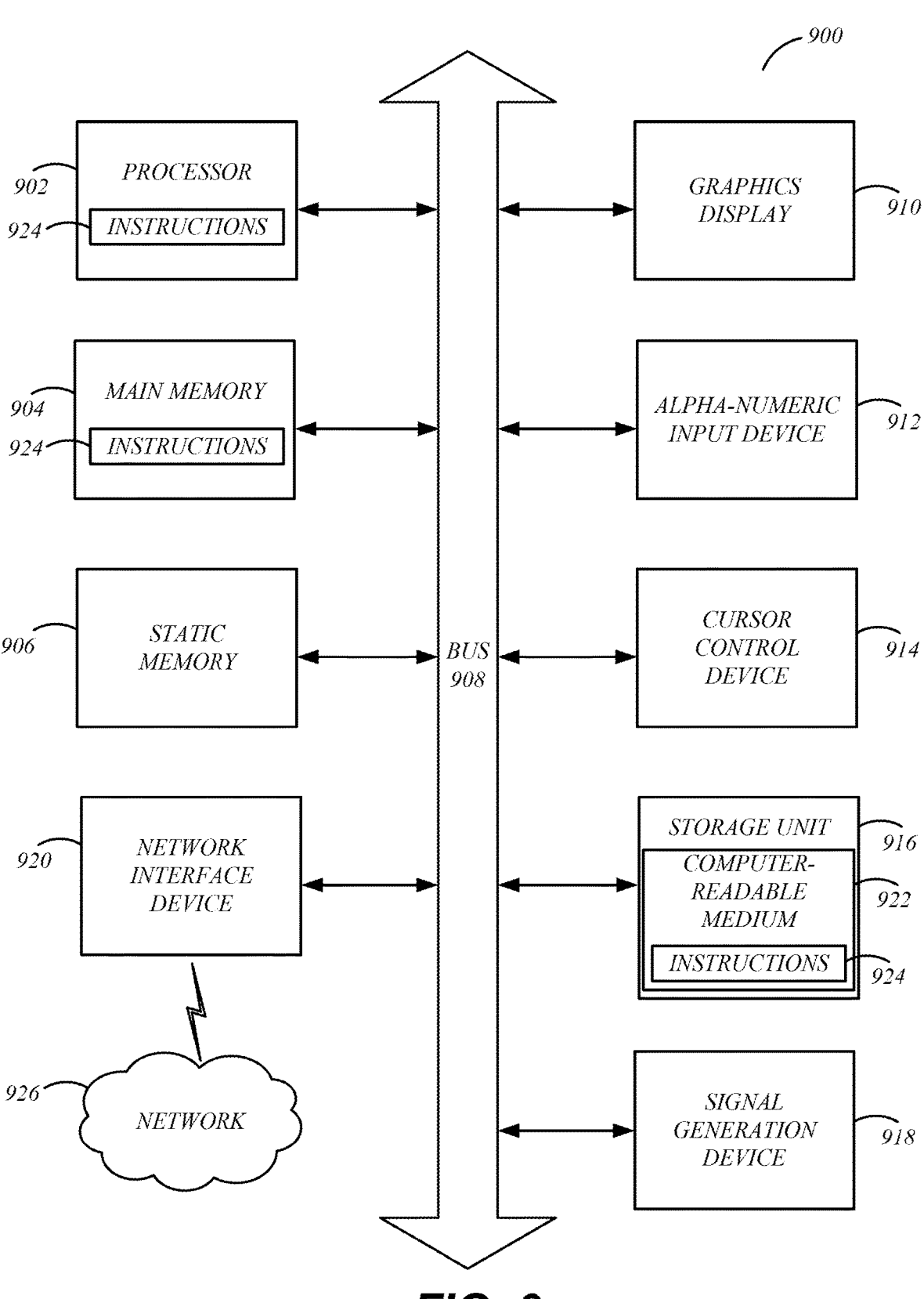
FIG. 9 is a block diagram illustrating components of an example computing machine that is capable of reading instructions from a computer-readable medium and executing them in a processor (or controller).

FIG. 9 is a block diagram illustrating components of an example computing machine that is capable of reading instructions from a computer-readable medium and executing them in a processor (or controller). A computer described herein may include a single computing machine shown in FIG. 9, a virtual machine, a distributed computing system that includes multiple nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIGS. 1, 2, and 3, including but not limited to, the user device 110, the computing server 130, an on-premises node 125, a hosted node 135, a node of a blockchain network, and various engines, modules interfaces, terminals, and machines shown in FIG. 2. While FIG. 9 shows various hardware and software elements, each of the components is described in FIGS. 1, 2, and 3 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors (generally, processor 902) (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 904, and a static memory 906, which are configured to communicate with each other via a bus 908. The computer system 900 may further include graphics display unit 910 (e.g., a plasma display panel (PDP), a liquid crystal display (LCD), a projector, or a cathode ray tube (CRT)). The computer system 900 may also include an alphanumeric input device 912 (e.g., a keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a computer-readable medium 922 on which are stored instructions 924 embodying any one or more of the methodologies or functions described herein. The Instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The Instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the machine and that causes the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g., computer program product, system, or storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

In some embodiments, a computer-readable medium includes one or more computer-readable media that, individually, distributedly, or together, include instructions that, when executed by one or more processors, cause the one or more processors to perform, individually, distributedly, or together, the steps of the instructions stored on the one or more computer-readable media. Similarly, a processor includes one or more processors or processing units that, individually, distributedly, or together, perform the steps of instructions stored on a computer-readable medium. When in this disclosure refers to one or more processors performing one or more steps, in various embodiments the one or more processors may individually, distributedly, or together perform those steps and the use of the phrase one or more processors by no means to imply that a single process has to perform every single step. For example, in a device that has multiple processors, one processor may perform step one and another processor may perform step two. Similar situation may apply to distributed computing. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situations such as in multiple processors of a system in a chip, in Cloud computing, or in distributed computing.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system for performing a multi-party computation (MPC) operation, the system comprising:

an MPC node comprising memory and one or more processors, the MPC node executed in a secure enclave, the MPC node comprising executable instructions injected into the secure enclave to create an execution environment, wherein the executable instructions, when executed by the one or more processors of the secure enclave, cause the one or more processors to:

perform an attestation check on the execution environment that relies on a private cryptographic key shard to carry out an MPC operation, the attestation check comprises checking state information of the execution environment to attest that the secure enclave has not been tampered;

generate a result of the attestation check; and cause the secure enclave to create a cryptographic signature on the result of the attestation check; and an attestation node in communication with the secure enclave, the attestation node configured to:

verify the cryptographic signature on the result of the attestation check to determine that the secure enclave has not been tampered;

responsive to verifying that the secure enclave has not been tampered, cause a decryption of an encrypted private cryptographic key shard to generate a decrypted private cryptographic key shard, wherein the decrypted cryptographic key shard is used by the MPC node to perform the MPC operation.

2. The system of claim 1, wherein the executable instructions are part of a bootstrapping package to inject an operating system image into the secure enclave to create the execution environment.

3. The system of claim 2, wherein the bootstrapping package further cause the one or more processors of the secure enclave to fetch one or more configuration parameters for the MPC node to create the execution environment.

4. The system of claim 1, wherein the memory of the secure enclave is a non-persistent storage that erases the decrypted cryptographic key shard in the memory after the MPC node is terminated.

5. The system of claim 1, wherein the attestation check comprises:

generating a quote comprising the state information of the execution environment of the secure enclave; and verifying that one or more register counter values in the quote match one or more expected values.

6. The system of claim 1, wherein the secure enclave is associated with a secure enclave private key, and the cryptographic signature is generated by the secure enclave signing the state information of the execution environment using the secure enclave private key.

7. The system of claim 1, wherein the attestation node is in communication with the secure enclave through a secure channel that is proof against man-in-the-middle attacks.

8. The system of claim 1, wherein the decryption of the encrypted private cryptographic key shard comprises:

decrypt, responsive to the cryptographic signature being verified, an encryptor key file;

use the encryptor key file to decrypt one or more configuration data for the MPC node; and use the encryptor key file to decrypt the encrypted private cryptographic key shard.

9. The system of claim 1, wherein the encrypted private cryptographic key shard is stored in a persistent storage outside of the secure enclave, and the decryption of the encrypted private cryptographic key shard comprises:

fetching, by the attestation node, the encrypted private cryptographic key shard from the persistent storage;

decrypting the encrypted private cryptographic key shard;

encrypting a key shard using an enclave public key; and transmitting the encrypted key shard to the secure enclave that decrypts the key shard using an enclave private key.

10. The system of claim 1, wherein the MPC node is a first MPC node, the secure enclave is a first secure enclave, and the decrypted cryptographic key shard is a first decrypted cryptographic key shard, wherein the system further comprises a second MPC node executed in a second secure enclave and the second MPC node is associated with a second decrypted cryptographic key shard different from the first decrypted cryptographic key shard, and wherein the first MPC node and the second node jointly perform the multi-party computation operation using respective decrypted cryptographic key shards.

11. The system of claim 1, wherein the cryptographic signature is time bound to a valid period and the attestation check is performed periodically.

12. The system of claim 1, wherein the decrypted private cryptographic key shard is a shard of a private cryptographic key that has a public cryptographic key, and the multi-party computation operation comprises a blockchain operation associated with a blockchain address corresponding to the public cryptographic key.

13. A computer-implemented method, comprising:

injecting executable instructions associated with a multi-party computation (MPC) node into a secure enclave to create an execution environment of the MPC node in the secure enclave;

performing an attestation check on the execution environment that relies on a private cryptographic key shard to carry out an MPC operation, the attestation check comprises checking state information of the execution environment to attest that the secure enclave has not been tampered;

generating a result of the attestation check;

causing the secure enclave to create a cryptographic signature on the result of the attestation check;

verifying the cryptographic signature on the result of the attestation check to determine that the secure enclave has not been tampered; and responsive to verifying that the secure enclave has not been tampered, causing a decryption of an encrypted private cryptographic key shard to generate a decrypted private cryptographic key shard, wherein the decrypted cryptographic key shard is used by the MPC node to perform an MPC operation.

14. The computer-implemented method of claim 13, wherein the executable instructions are part of a bootstrapping package to inject an operating system image into the secure enclave to create the execution environment.

15. The computer-implemented method of claim 14, wherein the bootstrapping package further causes the secure enclave to fetch one or more configuration parameters for the MPC node to create the execution environment.

16. The computer-implemented method of claim 13, wherein memory of the secure enclave is a non-persistent storage that erases the decrypted cryptographic key shard in the memory after the MPC node is terminated.

17. The computer-implemented method of claim 13, wherein the attestation check comprises:

generating a quote comprising the state information of the execution environment of the secure enclave; and verifying that one or more register counter values in the quote match one or more expected values.

18. The computer-implemented method of claim 13, wherein the secure enclave is associated with a secure enclave private key, and the cryptographic signature is generated by the secure enclave signing the state information of the execution environment using the secure enclave private key.

19. The computer-implemented method of claim 13, wherein the attestation node is in communication with the secure enclave through a secure channel that is proof against man-in-the-middle attacks.

20. The computer-implemented method of claim 13, wherein the decryption of the encrypted private cryptographic key shard comprises:

decrypting, responsive to the cryptographic signature being verified, an encryptor key file;

using the encryptor key file to decrypt one or more configuration data for the MPC node; and using the encryptor key file to decrypt the encrypted private cryptographic key shard.

* * * * *